United States Patent
Matlin et al.

(10) Patent No.: US 11,553,442 B2
(45) Date of Patent: Jan. 10, 2023

(54) HOPPING SCHEME FOR EMBEDDED WIRELESS SENSORS

(71) Applicant: Phase IV Engineering, Inc., Boulder, CO (US)

(72) Inventors: Mark Daniel Matlin, Boulder, CO (US); Scott David Dalgleish, Boulder, CO (US); Jason Michael Wild, Denver, CO (US)

(73) Assignee: HerdStrong LLC., Greeley, CO (US)

(*) Notice: Subject to any disclaimer, the term of this patent is extended or adjusted under 35 U.S.C. 154(b) by 26 days.

(21) Appl. No.: 17/359,323

(22) Filed: Jun. 25, 2021

(65) Prior Publication Data

US 2021/0329569 A1    Oct. 21, 2021

Related U.S. Application Data

(63) Continuation-in-part of application No. 16/166,114, filed on Oct. 21, 2018, now Pat. No. 11,056,774, which is a continuation-in-part of application No. 15/965,641, filed on Apr. 27, 2018, now Pat. No. 10,390,515.

(60) Provisional application No. 62/491,358, filed on Apr. 28, 2017.

(51) Int. Cl.
*H01Q 1/12* (2006.01)
*H04W 52/36* (2009.01)
*H04W 52/18* (2009.01)

(52) U.S. Cl.
CPC ........... *H04W 52/36* (2013.01); *H04W 52/18* (2013.01)

(58) Field of Classification Search
CPC .............................. H04W 52/36; H04W 52/18
See application file for complete search history.

(56) References Cited

U.S. PATENT DOCUMENTS

| | | | |
|---|---|---|---|
| 5,482,008 A | 1/1996 | Stafford et al. | |
| 6,012,415 A | 1/2000 | Linseth | |
| 6,371,927 B1 | 4/2002 | Brune et al. | |
| 7,026,939 B2 | 4/2006 | Letkomiller et al. | |
| 7,112,752 B1 | 9/2006 | Wenner | |
| 7,558,620 B2 | 7/2009 | Ishibashi | |
| 8,640,712 B2 | 2/2014 | Ardrey | |
| 8,771,201 B2 | 7/2014 | Gabriel et al. | |
| 9,504,231 B2 | 11/2016 | Rosenkranz et al. | |
| 2002/0010390 A1 | 1/2002 | Guice et al. | |
| 2008/0236500 A1 | 10/2008 | Hodges et al. | |
| 2009/0187392 A1 | 7/2009 | Riskey et al. | |
| 2010/0300462 A1 | 12/2010 | Ardrey | |

(Continued)

*Primary Examiner* — Binh B Tran
(74) *Attorney, Agent, or Firm* — Kenneth Altshuler

(57) ABSTRACT

A wireless communication method to alter RF regulatory channel hopping requirements (regulations) between a pair of transceivers is envisioned wherein an embedded transceiver embedded in an RF attenuating medium transmits signals at a lower hopping requirement than a paired open-air transceiver. The communication method adheres to these regulations, which define a threshold power for transmission above which require a high degree of frequency hopping. Because the attenuating medium attenuates the open-air RF signal from the embedded transceiver, channel hopping in the embedded transceiver is lowered however, the channel hopping in the open-air transceiver is not lowered. The two transceivers are essentially powered equally.

20 Claims, 19 Drawing Sheets

(56) References Cited

U.S. PATENT DOCUMENTS

2012/0161964 A1  6/2012  Rettedal et al.
2012/0277550 A1  11/2012  Rosenkranz et al.
2017/0001003 A1* 1/2017  Pivonka ............... A61B 5/4836

* cited by examiner

HOPPING SCHEME FOR EMBEDDED WIRELESS SENSORS

CROSS-REFERENCE TO RELATED APPLICATIONS

This application is a Continuation-In-Part Application which claims priority to and the benefit of U.S. patent application Ser. No. 16/166,114: entitled: AUTOTUNE BOLUS ANTENNA filed on Oct. 21, 2018, the entire disclosure of which is hereby incorporated by reference; U.S. patent application Ser. No. 16/166,114 claims priority to and the benefit of U.S. patent application Ser. No. 15/965,641: entitled: BOLUS ANTENNA SYSTEM filed on Apr. 27, 2018, the entire disclosure of which is hereby incorporated by reference; U.S. patent application Ser. No. 15/965,641 claims priority to and the benefit of U.S. Provisional Patent Application Ser. No. 62/491,358, entitled BOLUS ANTENNA SYSTEM filed Apr. 28, 2017, the entire disclosure of which is also hereby incorporated by reference.

FIELD OF THE INVENTION

The present embodiments are directed to leveraging RF attenuation in an RF attenuating medium to avoid channel hopping.

DESCRIPTION OF RELATED ART

For at least three decades, ranchers have been monitoring their cattle by way of ID systems transmitted from boluses ingested by each of their cattle. Generally speaking, ruminant animals, such as a cow, can be administered a bolus capsule that encase electronic identification systems and sensors, such as temperature sensors. Upon swallowing a bolus, a cow or bull will typically retain the bolus permanently in their second stomach compartment or reticulum. In general, a bolus includes a battery, and other electronics that wirelessly broadcast identification numbers and sensor values. In some instances, boluses do not have a battery but rather rely on power through inductive fields commonly used in passive RFID systems. Nevertheless, if a bolus is going to transmit data wirelessly it is going to require an antenna. Because the ruminant animal that hosts the bolus inherently attenuates signals transmitted by the bolus, engineers and designers use antennas that have a number of loops to approximate the wavelength of the frequency transmitted by the bolus. Moreover, engineers and designers use lower frequencies around or below 300 MHz transmitted to better travel through the animal. Because transmission is typically relegated to a few feet away, the ruminant animal sometimes wears an amplifier system on their ear or around their neck to extend the signal to a receiver. Those designs that do not employ an amplifier on the external part of the animal, depend on directional transmission from the bolus. By directionally transmitting signals, a bolus can transmit 50 to 75 feet in one direction.

It is to innovations related to this subject matter that the claimed invention is generally directed.

SUMMARY OF THE INVENTION

The present invention is directed to leveraging RF attenuation in an RF attenuating medium, such as a cow tissue, to avoid channel hopping of an implantable one-way and two-way near omnidirectional radio frequency communication radio device residing in an attenuating medium (e.g., an animal) adapted to be used with a receiver that is external to the attenuating medium.

Certain embodiments of the present invention contemplate a method comprising providing an embedded transceiver that adheres to a radio frequency ("RF") regulatory requirement that defines a threshold power for transmission ("threshold power"). Above the threshold power, the embedded transceiver adheres to hopping requirement parameters that includes hopping from a first frequency channel to one of a different predefined number of frequency channels at less than or equal to a designated time interval/window. Below the threshold power, adhering to non-hopping requirement parameters that do not include the hopping to the one of the different predefined number of the frequency channels at the time window. The method further includes powering the embedded transceiver to an output transmission power at or above the threshold power. Once powered, the method envisions embedding the embedded transceiver in a transmission power attenuating medium ("medium") that reduces the output transmission power from above the threshold power inside of the medium to below the threshold power outside of the medium. The embedded transceiver is set to transmit data transmissions in accordance with the non-hopping requirement parameters. When embedded in the medium, a data packet is transmitted from the embedded transceiver.

Other embodiments contemplate a transceiver data exchange method comprising providing an embedded transceiver that adheres to an RF regulatory requirement that defines a threshold power. When above the threshold power the embedded transceiver adheres to hopping requirement parameters that includes hopping to one of a different predefined number of frequency channels at a time interval of less than a predefined maximum channel transmission interval "high power channel hopping routine". Below the threshold power, the embedded transceiver adheres to non-hopping requirement parameters that do not include the hopping to the one of the different predefined number of the frequency channels at the time interval "low power channel hopping routine". The embedded transceiver is embedded in a transmission power attenuating medium that reduces transmission power from above the threshold power inside of the medium to below the threshold power outside of the medium. The embedded transceiver is powered to an output power at or above the threshold power. Only because the embedded transceiver is embedded in the medium, setting the embedded transceiver to transmit data transmissions with the low power channel hopping routine. For example, if the embedded transceiver was not embedded in the medium then the transceiver could not be set to the low power channel hopping routine. A data packet is then transmitted from the embedded transceiver when embedded in the medium at the lower power channel hopping routine.

Yet, other embodiments of the present invention can therefore comprise a two-way wireless communication method comprising providing an embedded transceiver and an open-air transceiver that both comply with an RF regulatory requirement. The transceivers and are equally powered to an output power at or above a threshold power, wherein at or above the threshold power requires channel hopping of at least 25 channels "full channel hopping routine" in accordance with the RF regulatory requirement. Below the threshold power the RF requirements do not require channel hopping above 10 channels "limited channel hopping routine". Channel hopping is defined as changing from one of the channels to a different of the channels after a transmission time window that is less than a predefined maximum channel transmission window. The embedded transceiver in a transmission power attenuating medium that reduces the output power outside of the attenuating medium to below the threshold power. The embedded transceiver is set to the limited channel hopping routine only because the embedded transceiver is in the attenuating medium when transmitting a data packet to the open-air transceiver.

DETAILED DESCRIPTION

Figure 1A:
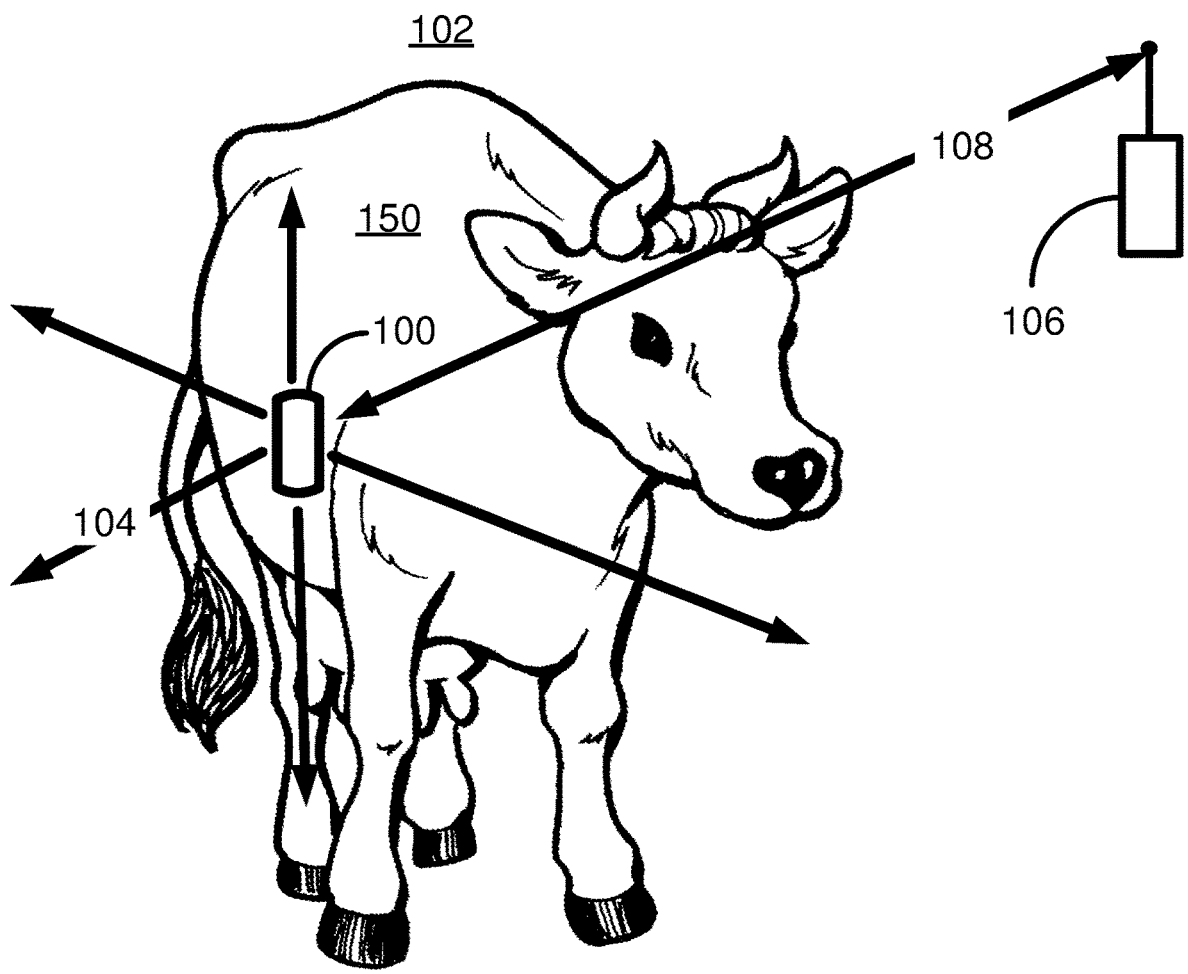
FIG. 1A illustratively depicts a bolus ingested by a cow transmitting radio wave signals in an omnidirectional pattern consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving efficient communication between and embedded transceiver and open-air transceiver. The phrases "in one embodiment", "according to one embodiment", and the like generally mean the particular feature, structure, or characteristic following the phrase is included in at least one embodiment of the present invention, and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". In what follows, similar or identical structures may be identified using identical callouts.

International regulatory channel hopping requirements (regulations) around RF ISM devices is necessary for harmonious communication amongst a pair of ISM transceivers operating overcrowded airways. Unfortunately, if an ISM transceiver is battery operated, these channel hopping regulations cause a drain on the ISM transceiver battery life. For ISM transceiver devices that are embedded or otherwise trapped in a medium and therefore inaccessible, these power-hungry hopping regulations result in a shortened battery life means a shortened transceiver life. One solution for transceivers that are embedded in an RF attenuating medium is to provide full power and yet adhere to lower channel hopping regulations based on open-air transmission power.

Certain aspects of the present invention contemplate wireless communication methods to alter RF regulatory channel hopping requirements between a pair of transceivers wherein one of the transceivers is an open-air transceiver and the other is an embedded transceiver embedded in an RF attenuating medium. The embedded transceiver transmits signals at a lower hopping requirement than a paired open-air transceiver. The two transceivers are essentially powered equally. The communication method adheres to the RF regulatory channel hopping requirements, which define a threshold power for transmission above which require a high degree of frequency hopping. Because the attenuating medium attenuates the open-air RF signal from the embedded transceiver, channel hopping in the embedded transceiver is lowered, however the channel hopping in the open-air transceiver is not lowered.

Other aspects of the inventions are directed to a variable tuning transceiver sealed in a protective housing, such as a bolus, is adjusted to transmit a near optimally tuned signal at a select frequency while in vivo in an animal. More specifically, the variable tuning transceiver provides a plurality of incident power transmissions over an antenna at a plurality of corresponding different capacitance levels as defined by a variable tuning circuit in the transceiver. A detector circuit, also in the transceiver, detects reflected power for each of the incident power transmissions conditioned at each capacitance level which is affected by the dielectric constant in the animal and any mismatches in the antenna. Each reflected power can then be stored in nontransient memory in the transceiver whereby the microprocessor, also in the transceiver, can select the capacitance level with the lowest reflected power found and therefore the strongest external signal from the capacitance levels sampled. Once selected, transmissions which include data from sensors within and on the animal are transmitted externally to an external receiver.

Other aspects of the present invention are generally related to two-way radiofrequency (RF) communication between an implantable bolus residing in an animal and a receiver that is external to the animal. For ease of explanation, embodiments described herein are directed to a bolus retained in a cow, and more specifically in a cow's stomach. However, the described embodiments are not limited to a bolus, nor is there any limitation to use in a cow or other ruminant animal, which include cattle, sheep, deer, goats, giraffes, etc. Nonetheless, the bolus embodiments can be advantageously used in a ruminant animal to monitor the ruminant animal's whereabouts and bodily functions, for example. In the case of a herd of cows, each cow can be monitored to determine if they are in a certain part of a field, are in a barn or corral, are sick or healthy, etc. In the case of a cow, a bolus is inserted down the cow's throat using a bolus applicator whereby the bolus passes into the cow's stomach. Typically, a bolus settles into the cow's reticulum. Regardless, the bolus is weighted so that it does not progress through the cow's digestive system through the cow's intestines and out the back end of the cow, or back up the throat of the cow and into the cow's mouth. The bolus is weighted to essentially sit inside of the cow's gut for the remainder, or length, of the cow's life.

Certain embodiments described herein are directed to a bolus capable of two-way wireless communication whereby the bolus can possess one or more sensors to monitor an animal's a) physical condition/internal vital signs, b) location, c) activity level (walking, running, lying down, eating, drinking, reticulo-rumen activity to identify changes in reticulum/rumen activity levels, etc.), d) identity, or other characteristics of interest about the animal. An omnidirectional radio frequency antenna, from the family of electrically small antennas, is disposed inside of the bolus along with the appropriate transceiver, memory, power supply (e.g., battery), RFID, bio sensors, computer processor and related computer functional capabilities. One or more external transceivers can be used to communicate with the bolus when in range of the bolus. Information gathered (and potentially processed onboard the bolus to identify illness, treatment, drug recommendations, etc., maybe even stored in history) by the one or more external transceivers can be transmitted to a computer system where the information can be gathered and stored, manipulated, reported upon, transmitted elsewhere, etc. Certain embodiments envision multiple external transceivers spaced apart such that the transceivers are essentially usually but not always in range of an animal occupying a particular region, such as pens or a pasture.

Certain embodiments contemplate an electrically small H-antenna connected to a conductive cylindrical antenna that houses a battery and chipset. The chipset can include, among other things, a transceiver, identification information uniquely tied to the bolus, processor and at least one sensor. The H-antenna and the conductive cylindrical antenna are arranged so that electrical currents that produce the radio waves are essentially always aligned to work together. The bolus is essentially a hermetically sealed capsule containing the antennas, which is intended to be ingested by a cow or other ruminant animal. The bolus is configured to transmit radio waves in essentially an omnidirectional pattern more efficiently when the bolus is inside of a cow stomach than when the bolus is outside of the cow (in air, for example).

Referring to FIG. 1A, a cow 102 is illustratively shown with an ingested bolus 100 transmitting data about the cow 102 by way of radio waves 104 in essentially an omnidirectional pattern as illustratively shown by the arrows. The ingested bolus 100 is an embodiment of an embedded transceiver that is embedded inside of a cow 102. When in the cow 102, the transmission power generated at the embedded transceiver 100 is attenuated by the cow's tissue when the transmission reaches open-air 152. The cow's tissue is generally considered one of many examples of an attenuating medium 150, or simply "medium". An attenuating medium is a material that causes radio frequency (RF) transmission power of an RF signal to diminish as the RF signal passes through the attenuating medium. The bolus 100 is approximately 3 to 4½ inches in length and 1 inch in diameter. A similar bolus within the scope and spirit of the present invention can vary in size according to the particular animal application. In this figure, the bolus transmissions are picked up by the external transceiver 106 whereby two-way communication can occur between the external transceiver 106 and the bolus 100, depicted by the two-way arrow 108. This concept can be equally applied to other animals or humans.

Figure 1B:
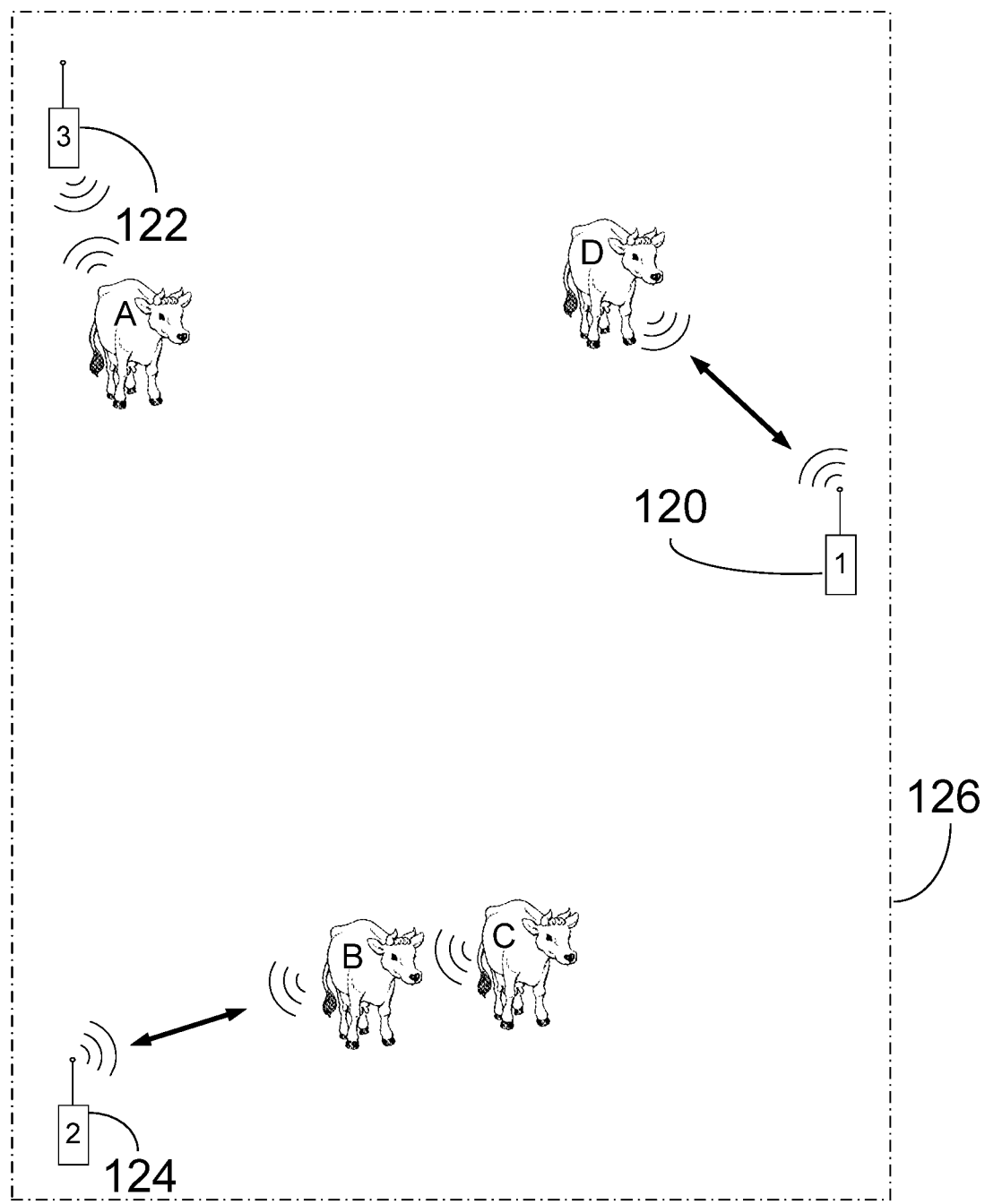
FIG. 1B illustratively shows a plurality of cows distributed in a fenced in region transmitting radio wave signals in an omnidirectional pattern to external transceiver devices consistent with embodiments of the present invention.

FIG. 1B illustratively shows a plurality of cows distributed in a fenced in region 126. Here, cows A-D each have an implanted bolus that specifically identifies each animal. For example, cow "A" is identified by bolus "A", cow "B" is identified by bolus "B", and so on. In this embodiment, there are three external transceivers 120-124 spaced apart and distributed in the fenced region 126. Accordingly, cow "D" is in two-way communication with external transceiver #1 120, cow "A" is in two-way communication with external transceiver #3 122, and cows "B" and "C" are in two-way communication with external transceiver #2 124. The cows can be in constant communication with the external transceivers, in intermittent communication with the external transceivers at set periods of time, or when contacted by an external transceiver, just to name three examples of how two-way communication is initiated. Of course, intermittent communication techniques will help preserve battery life of the bolus 100 by placing the bolus 100 into a quiescent state (or sleep state), discussed in more detail later. This can be accomplished with the appropriate circuitry internal to the bolus 100, or optionally can be controlled by an external transceiver 106. When the external transceiver 106 controls a quiescent state of a bolus, the external transceiver 106 instructs the bolus 100 to go into a quiescent state. After a set amount of time or at the discretion of an operator, the external transceiver 106 (or different external transceiver) can instruct the bolus 100 to wake up and operate at full power. In other embodiments, the external transceiver 106 can send updated "transmit interval times" to the bolus 100, which in turn causes the bolus 100 to utilize those updated times to control the sleep mode. Certain embodiments envision a battery that can provide constant power to the bolus 100 throughout the life of the host cow 102. Certain embodiments contemplate a bolus 100 associated with a particular host cow taking vital signs (in addition to other sensed information) and then storing those vital signs in the bolus memory with the appropriate time stamp (time/day/order/etc.) followed by transmitting the data associated with a particular bolus/cow to an external transceiver 106. In some cases, after being transmitted, there may be no need to retain the data inside of the bolus memory, hence the data can be erased. Erasure can occur immediately after transmission or at some designated time thereafter. Certain embodiments contemplate transmitting data from one external transceiver to another before going to a host computer (not shown), e.g., information from external transceiver-3 122 passing data to external transceiver-2 124, whereby external transceiver-2 124 sends all data in possession to a host computer. Optionally, a high reliability over the air radio transmit methodology can be employed, which can include a clear channel assessment (cca) to verify that there is no other bolus or external transceiver transmitting before a bolus starts to send data over the radio. An external transceiver can be equipped with a real-time clock that may be used to reset all bolus clocks in RF range. Some embodiments envision that a given bolus 100 will go into a "receive" mode after transmitting and attempt to receive a message back from an external transceiver 106 with an acknowledgment, updated time, or other bolus reconfiguration message/s. This acknowledgement may also be used to erase the sensor data inside the bolus 100.

Figure 1C:
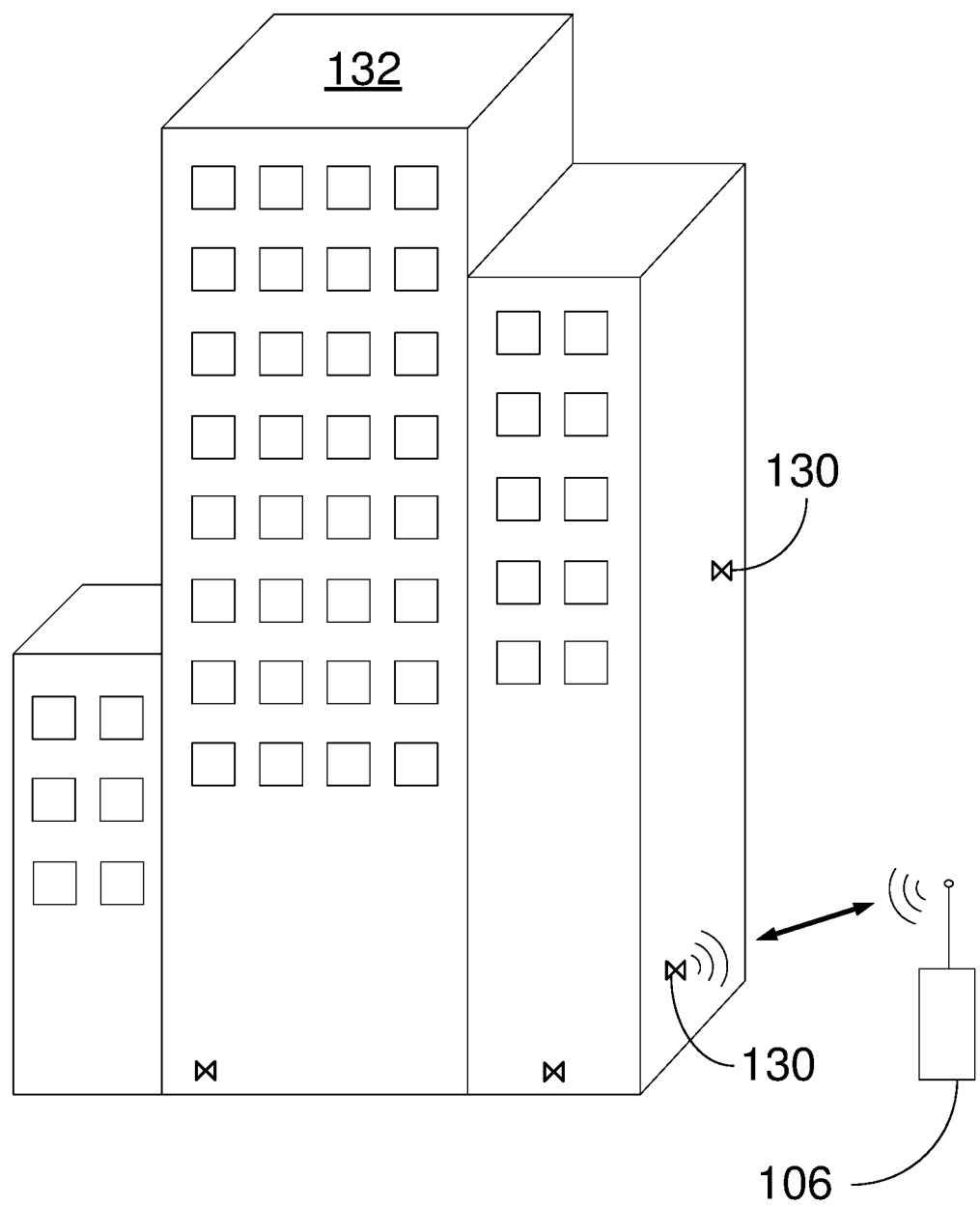
FIG. 1C is a line drawing of an embedded transceiver in a structure consistent with embodiments of the present invention.

FIG. 1C is a line drawing of an embedded transceiver in a structure consistent with embodiments of the present invention. As shown, there are a plurality of embedded transceivers 130 that are embedded in the structure of a building 132, such as in concrete or mounted on beams that are encased in other building materials, just to name several examples. One of the embedded transmitters 130 is depicted engaged in two-way communication with an open-air (external) transmitter 106. The embedded transmitters 130 help make the building 132 a 'smart building' because the sensors can provide information to a remote observer about the movement and/or structural stability of the building 132. Certain embodiments envision a remote observer (end user or a computer system) being able monitor the health of one to a plurality of buildings from a remote location. Other uses of in embedded transceiver 130 is to embed in concrete to monitor temperature during curing or the strain of rebar also embedded in concrete. Like the bolus 100, certain embodiments envision an embedded transmitter encased in a housing with many of or all of the features discussed in conjunction with the bolus 100.

Figure 2:
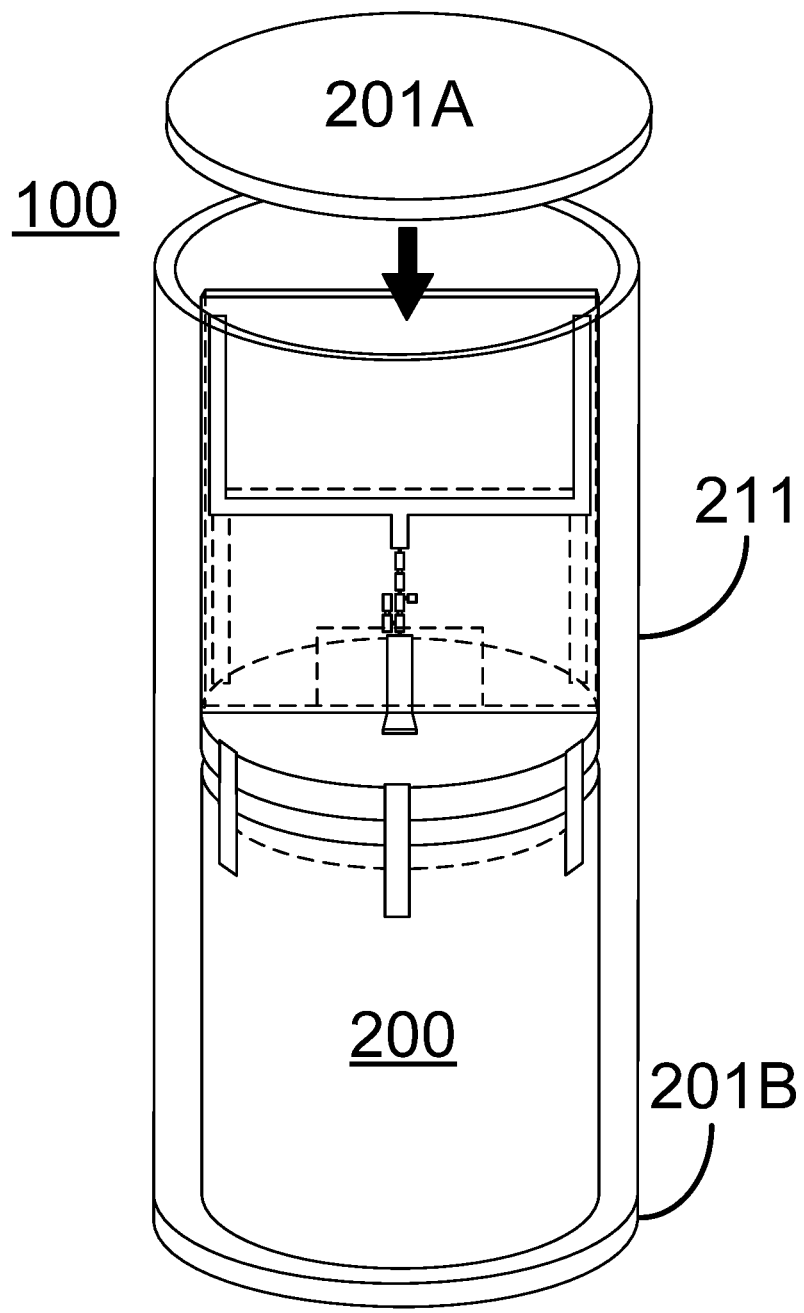
FIG. 2 depicts an embodiment of certain basic internal elements of a bolus consistent with embodiments of the present invention.

The weighted bolus 100 is essentially a "smart" capsule containing internal electrical components. FIG. 2 depicts an embodiment of certain basic internal elements of the bolus 100 consistent with embodiments of the present invention. In the embodiment shown, the bolus 100 generally comprises a nonmetallic bolus case tube 211, which in one embodiment is a polymer, having a pair of end caps 201A and 201B that hermetically seal the bolus internal components 200 from the contents of a cow's stomach. Certain embodiments envision one endcap, while the other end is simply molded with the capsule like a test tube. The interface between the end caps 201A and 201B and bolus case tube 211 can be sealed/welded by way of an adhesive, for example, ultrasonic welding, or other means known to those skilled in the art.

Figure 3:
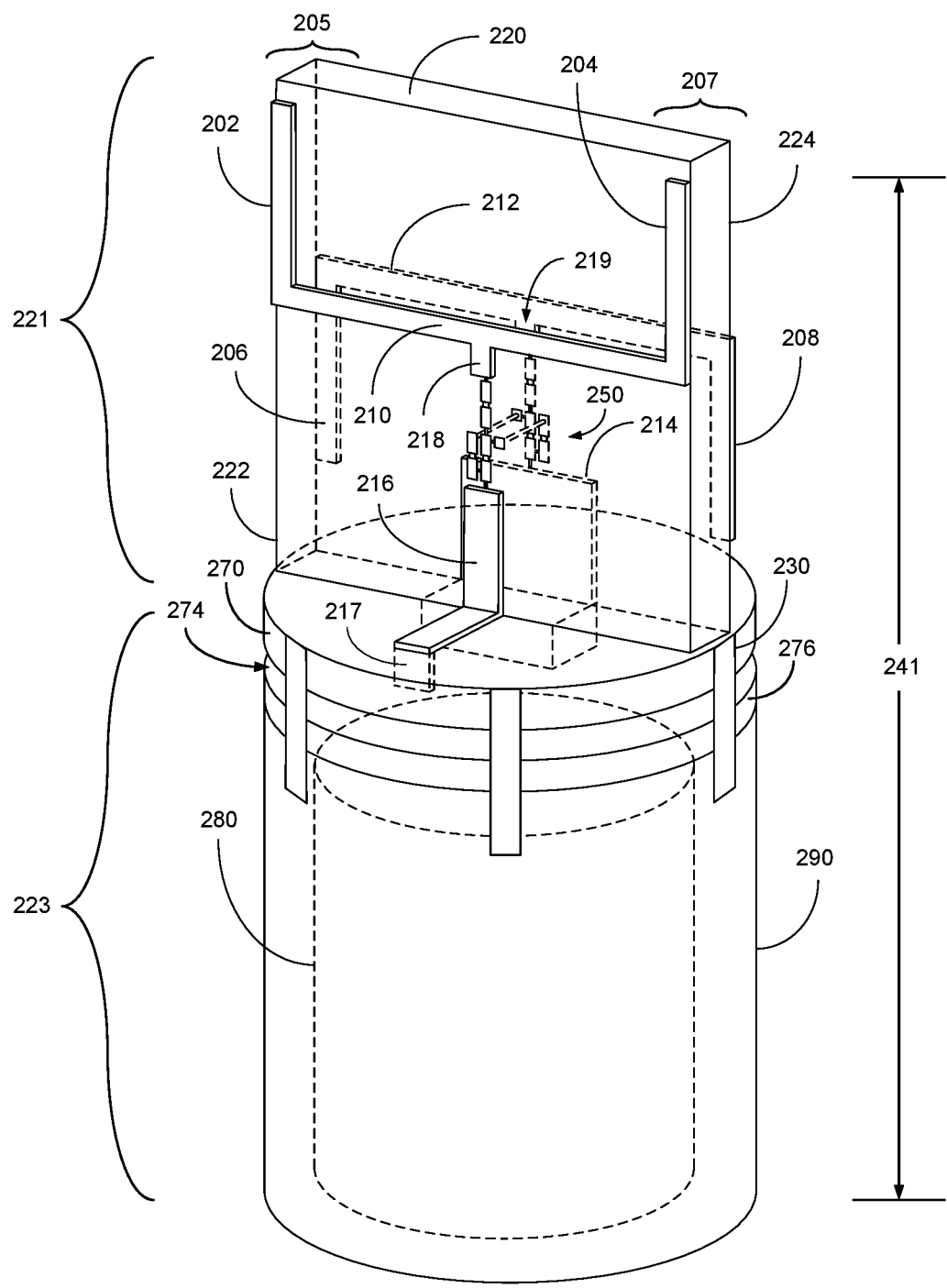
FIG. 3 illustratively depicts a more detailed perspective of an embodiment of the bolus internal components consistent with embodiments of the present invention.

FIG. 3 illustratively depicts an embodiment of the bolus internal components 200 consistent with embodiments of the present invention. For ease of explanation, the bolus internal components 200 will hereafter be shortened to simply the "bolus 200" when believed appropriate. In operation, the bolus 200 functions as a single antenna. On the upper part of the bolus 200 is an H-antenna 221 and the lower part of the bolus 200 is a conductive (metal) cylindrical antenna 223.

In greater physical detail, the present embodiment of FIG. 3 depicts the H-antenna portion 221 possessing a dielectric spacer 220, that is a clear polymer in this drawing, that has a front side 222 and the backside 224. The dielectric spacer 220 is about 1.5 mm thick that serves as a dielectric separating the microstrip transmission line 216 and the microstrip transmission line's ground plane 214. Certain embodiments contemplate the H-antenna portion 221 being constructed from standard printed circuit board materials and techniques. There is a first parallel plate transmission line 210 on the front side 222 of the spacer 220 whereby a first radiator 202 extends at 90° in an upward direction from one end of the first parallel plate transmission line 210 and a second radiator 204 extends at 90° in an upward direction from the other end of the first parallel plate transmission line 210. In the center of the first parallel plate transmission line 210 extending downward is a first parallel plate transmission line feed 218. Electrically connected to a printed circuit board 276 is a microstrip transmission line 216 at a driving point 217. Between the microstrip transmission line 216 and the first parallel plate transmission lead line 218 is a lattice balun (balanced to unbalanced) circuit 250 comprising lumped inductors and capacitors. On the backside 224 of the dielectric spacer 220 is a second parallel plate transmission line 212 whereby a third radiator 206 extends at 90° in a downward direction from one end of the second parallel plate transmission line 212 and the fourth radiator 208 that extends at 90° in a downward direction from the other end of the second parallel plate transmission line 212. In the center of the second parallel plate transmission line 212 extending downward is a second parallel plate transmission line feed 219. The other portion of the lattice balun circuit 250 connects to a microstrip transmission line ground plane 214.

Certain embodiments contemplate adding potting material (not shown) around the H-antenna 221 to add weight to the overall bolus 100. Moreover, the potting material can be somewhat rigid to stabilize the H-antenna 221 inside of the bolus 100. Potting material can be designed with an appropriate dielectric constant using various fillers, or optionally passive components for the antenna structure 221 can be used to match the dielectric constant of the potting material to improve RF transmission.

The H-antenna portion 221 is an electrically small antenna generally comprised of a pair of dipole antenna elements 205 and 207 that are directly fed with a parallel plate transmission lines 210 and 212 at a central driving point 218 and 219. Parallel plate transmission lines 210 and 212 are inherently electrically balanced as arranged. Electrically small antennas are defined as having a maximum dimension that is less than $\lambda/2\pi$ (as defined by Wheeler in 1947). In this embodiment, each dipole is about 24 mm long (see FIG. 6) and the RF wavelength ($\lambda$) is about 325 mm. The dipoles 205 and 207 are electrically close (i.e., so close together compared with the RF wavelength that the dipoles 205 and 207 behave like a single dipole and not as an array. That is, the dipoles 205 and 207 are spaced apart about 10% of the wavelength transmitted by the dipoles 205 and 207). The pair of dipoles 205 and 207 add to the stability of the H-antenna 221. The first dipole 205 is essentially comprised of the first radiator 202 and the third radiator 206, and the second dipole 207 is essentially comprised of the second radiator 204 and the fourth radiator 208.

Figure 4A:
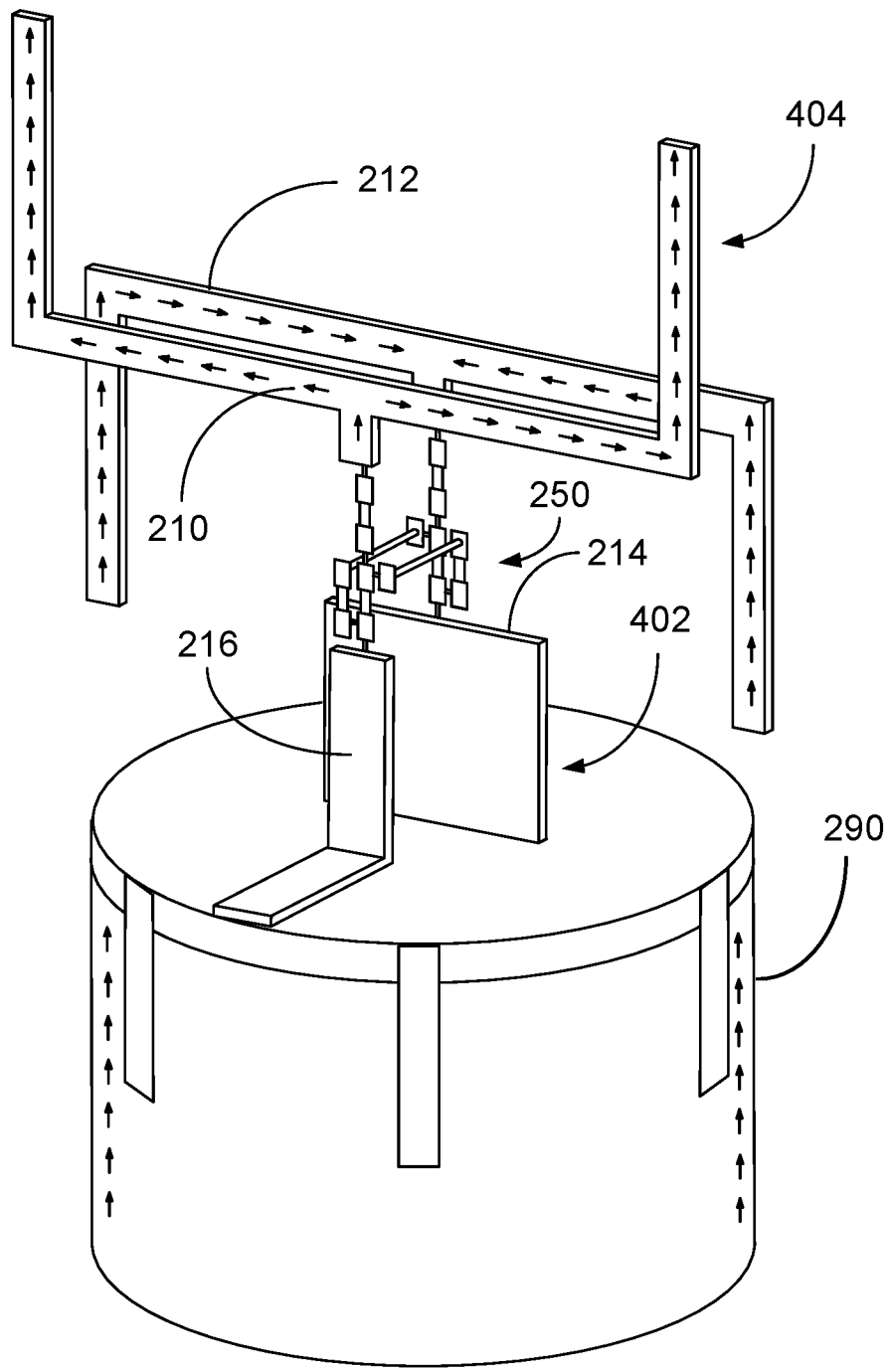
FIG. 4A depicts one state of electrical currents generated in the bolus antenna consistent with embodiments of the present invention.

One state (as opposed to the alternating current states required to generate electromagnetic waves) of the electrical currents is depicted by arrows as shown in FIG. 4A. The dipole pair 205 and 207 electrically couples to the conductive cylindrical element 290, thus making the cylindrical element 290 part of the overall radiating antenna. This enforces the omnidirectional electromagnetic wave radiating pattern shown in FIG. 4B. The H-antenna 221 has a driving point impedance with a large reactive value. This reactive part of the impedance is canceled with a pair of lumped elements forming the balun circuit 250. This cancellation creates a driving point impedance that is pure real at the design frequency. Because the driving point of most integrated circuits is designed to accept an unbalanced impedance, the lattice balun 250 comprised of lumped elements is integrated to both change the resistive value to that required by the PCB 276 and to act as a balun to change the transmission line mode from unbalanced to balanced. The microstrip transmission line 216 connects parallel plate transmission lines 210 and 212 of the H-antenna 221 to the radiofrequency PCB 276. There is a 0° and 180° phase difference of the currents generated in the first parallel plate transmission line 210 and the second parallel plate transmission line 212, which causes the currents to cancel out, and therefore produces a virtual ground between them. In other words, the opposite currents essentially cancel out in the first and second parallel plate transmission lines 210 and 212, therefore avoiding inadvertent feedline radiation.

Figure 6:
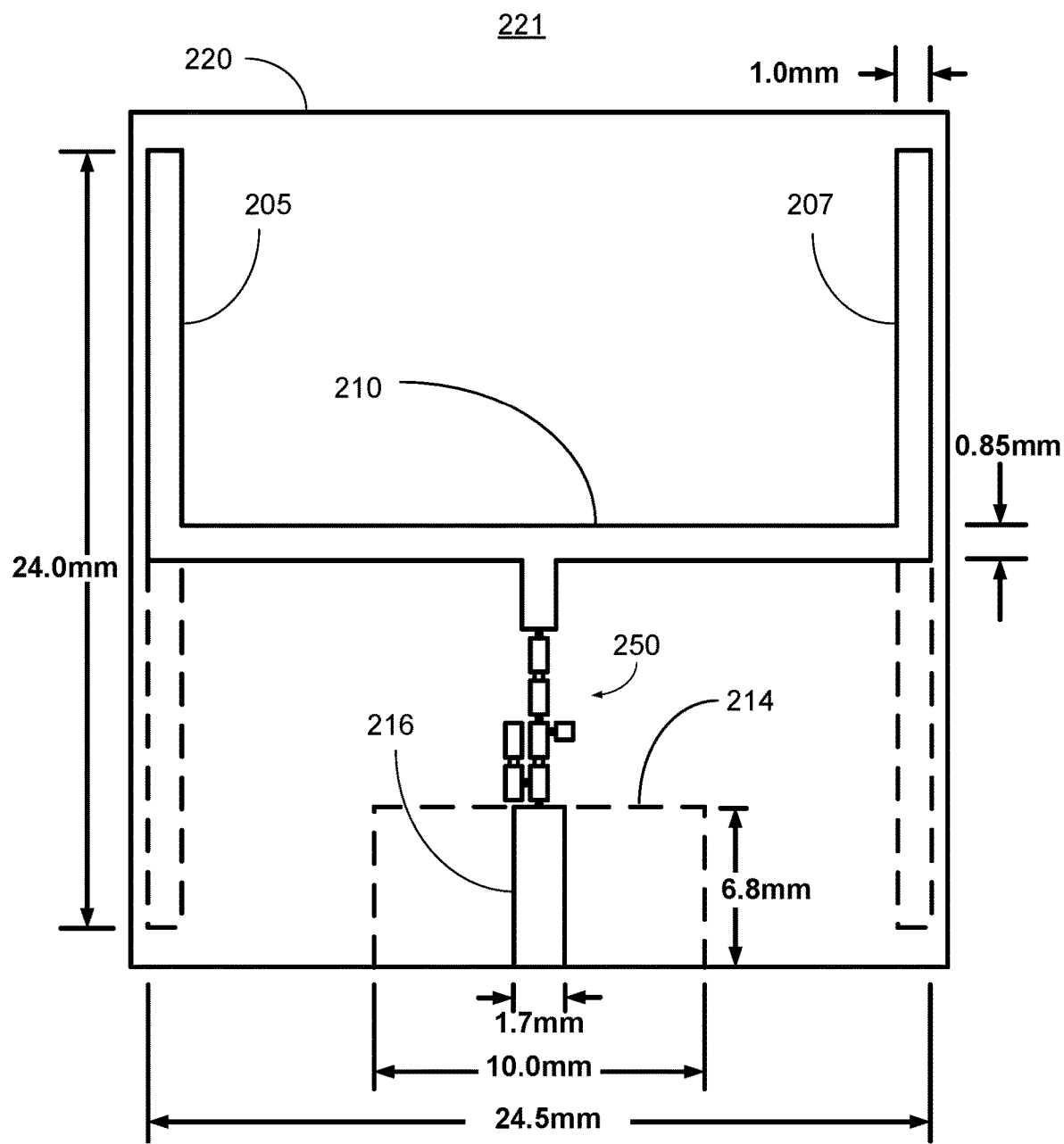
FIG. 6 illustratively depicts dimensions associated with a bolus embodiment consistent with embodiments of the present invention.

As previously mentioned the dielectric spacer 220 separates the microstrip transmission line's ground plane 214 from the microstrip transmission line 216. The microstrip transmission line 216 is on the unbalanced side 402 of the balun circuit 250, accordingly the microstrip transmission line 216 is unbalanced. The first and second parallel plate transmission lines 210 and 212 are balanced 404. As shown in FIG. 6, the microstrip transmission line 216 is 1.7 mm wide and the microstrip transmission line's ground plane 214 is 10 mm wide. Theoretically, the microstrip transmission line's ground plane 214 would extend in every direction infinitely, but in relation to the relatively thin metal microstrip transmission line 216, the microstrip transmission line's ground plane 214 looks essentially infinite. The microstrip transmission line 216 guides a bound electromagnetic wave, which is mostly bound between the microstrip transmission line's ground plane 214 and the microstrip transmission line 216. The bound electromagnetic wave is then transformed by the balun circuit 250 into an electromagnetic wave that travels essentially along the interior sides of the first and second parallel plate transmission lines 210 and 212. Because the first and second parallel plate transmission lines 210 and 212 have opposing fields they act as a transmission line and not radiators. The electromagnetic wave is no longer bound at the dipoles 205 and 207 because the currents are no longer opposing. The dipoles 205 and 207 are radiators. In addition, the currents in the dipoles 205 and 207 and the microstrip transmission line's ground plane 214 extend through the circular ground plate 270 and down the side of the metal cylindrical antenna 290. The waves then radiate essentially omnidirectionally into space via the dipoles 205 and 207 and metal cylinder 290. Hence, the metal cylinder 290 serves as an important part of the overall antenna as shown by the arrows pointing in the same direction. Certain embodiments envision the metal cylinder 290 being a sturdy metal pipe with an added purpose of increasing the density of the entire bolus 100 to target a density of 2.75 g/cc. Additional solid metal slugs (not shown) may be disposed inside the metal cylinder 292 to increase the bolus density to the target density of 2.75 g/cc. The conductive cylindrical antenna 290 can be shortened or lengthened to impact radio wave transmission. The conductive cylindrical antenna 290 can suppress any feedback because it is functioning as a waveguide below cutoff. The conductive cylinder 292 and the slug (not shown) can be electrically connected to the ground terminal of the battery 282 act as an electrical ground path from the negative battery terminal to the conductive cylinder 292 and then to the grounding connections that connect the conductive cylinder 292 to the circular ground plate 270.

Figure 4B:
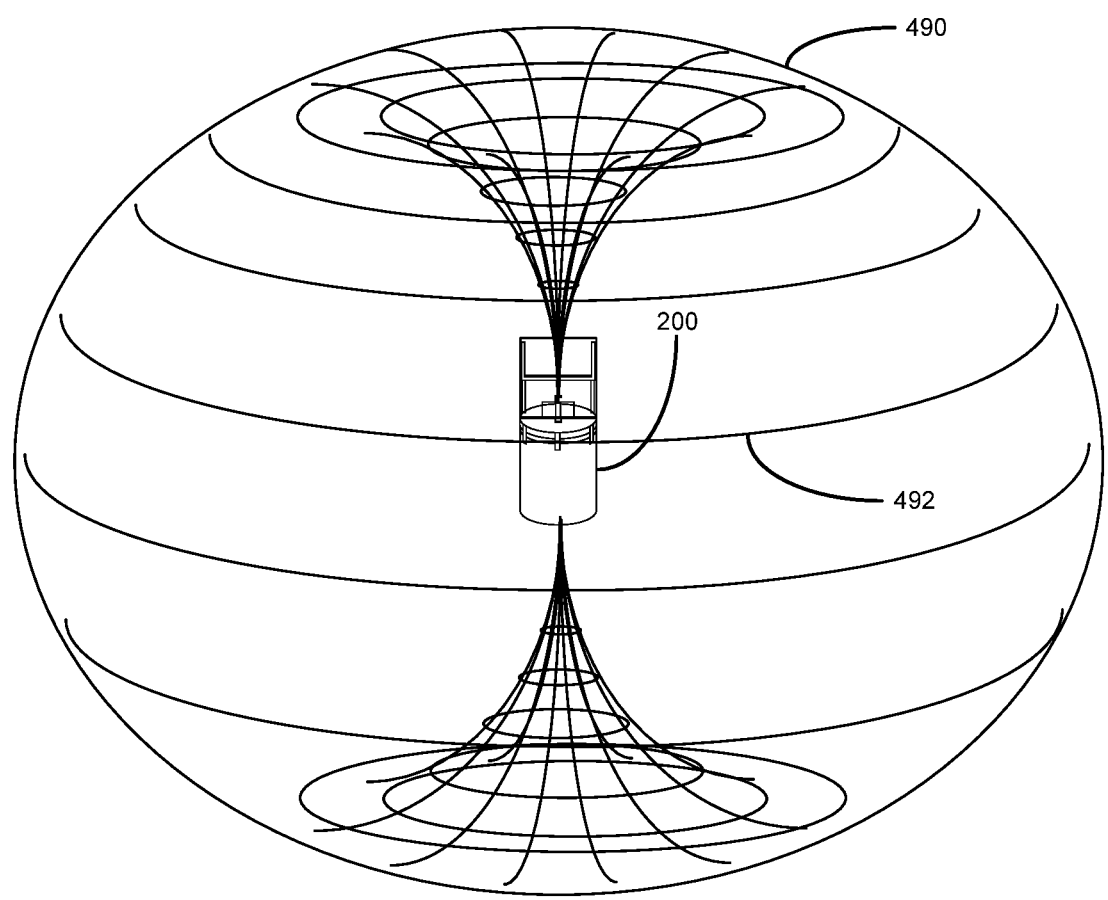
FIG. 4B illustratively depicts a model of the omnidirectional pattern into space generated by the bolus antenna system consistent with embodiments of the present invention.

FIG. 4B illustratively depicts a model of the omnidirectional pattern into space generated by the H-antenna 221 and metal cylinder 290. As is shown, the bolus radiates an omnidirectional RF pattern 490. The radiation lines 492 are used to illustratively show the three-dimensional model of the omnidirectional RF pattern 490. Certain embodiments contemplate the radio frequency at above 800 MHz. Other embodiments envision using non-licensed frequencies, such as 433 MHz and 315 MHz, for example.

With continued reference to FIG. 3, the H-antenna 221 rests atop the circular ground plate 270. The circular ground plate 270, which is the RF ground, produces a continuous ground connection through the ground straps 230 that conduct the electrical currents from the microstrip transmission line 216 generating an extension of electrical currents in the dipoles 205 and 207, thus making the entire length of the bolus 241 (H-antenna 221 and conductive cylinder 223) one complete antenna. Under the circular ground plate 270 is a primary circuit board 276 with a gap 274 separating the primary circuit board 276 from the circular ground plate 270. Certain embodiments envision the gap 274 having a consistent space between the primary circuit board 276 and the circular ground plate 270 created by equal sized spacers (not shown). Other embodiments envision the primary circuit board 276 extending below the circular ground plate and into the conductive cylinder 223. The circular ground plate 270 is electrically connected to the metal cylinder 290 by way of ground straps 230, three of which are shown in this figure. Certain embodiments envision more ground straps or even a continuous ground between the metal cylinder 290 and the circular ground plate 270. Other embodiments envision the ground straps being conductors that may be conductive wire, conductive straps, conductive tape, or other conductive materials that are adhered to the metal cylinder 292 by way of welding, conductive adhesion, or other methods to electrically connect to the metal cylinder 292. Disposed inside of the metal cylinder 290 is a battery 280, which serves as a power supply to the bolus 200. Though not shown, certain embodiments envision filler (potting) material that fills the area around the H-antenna 221 and adds weight to the bolus 100 to help meet the target density of 2.75 g/cc without significant radio energy attenuation.

Figure 5A:
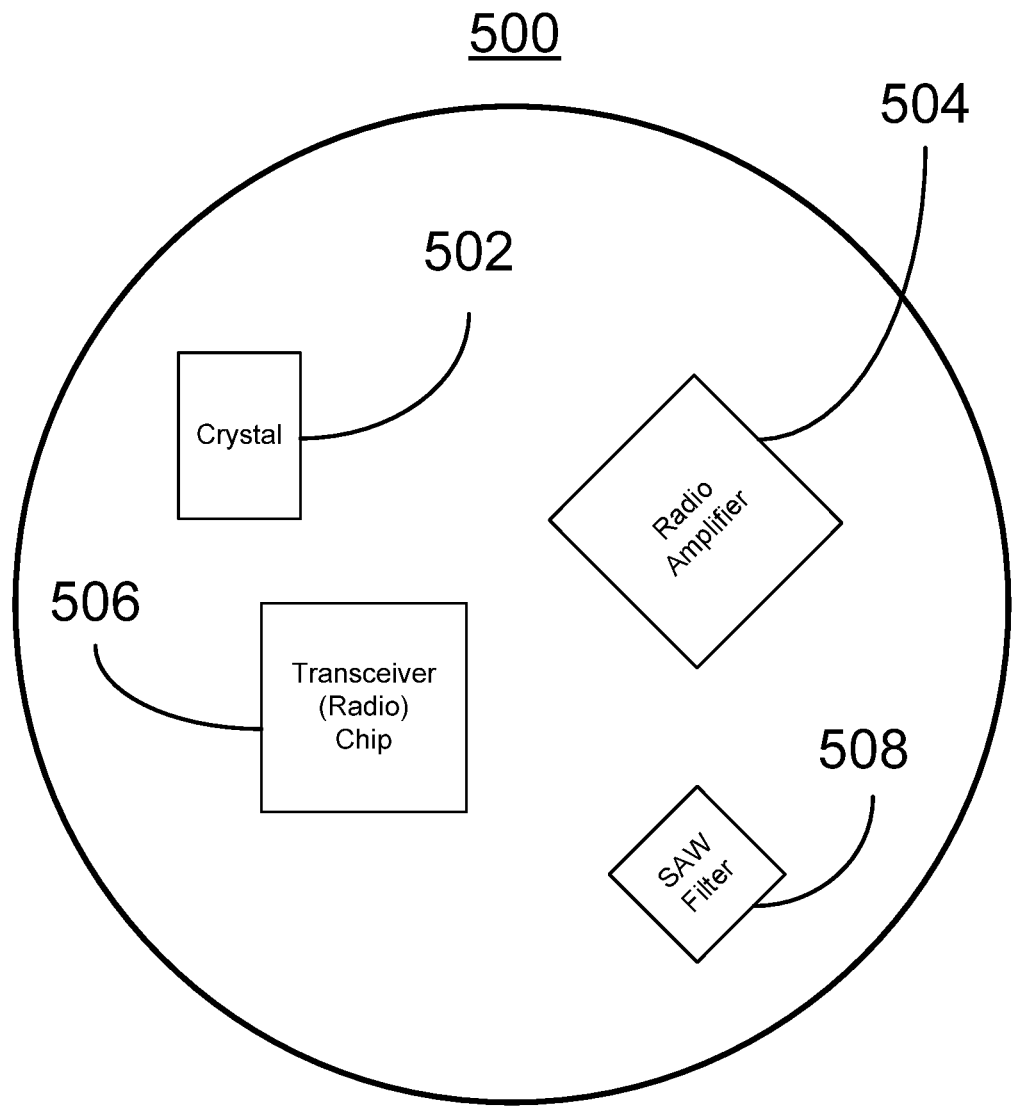
FIGS. 5A and 5B illustratively depict a basic top and bottom circuit board layout embodiment for certain bolus embodiments consistent with embodiments of the present invention.
Figure 5B:
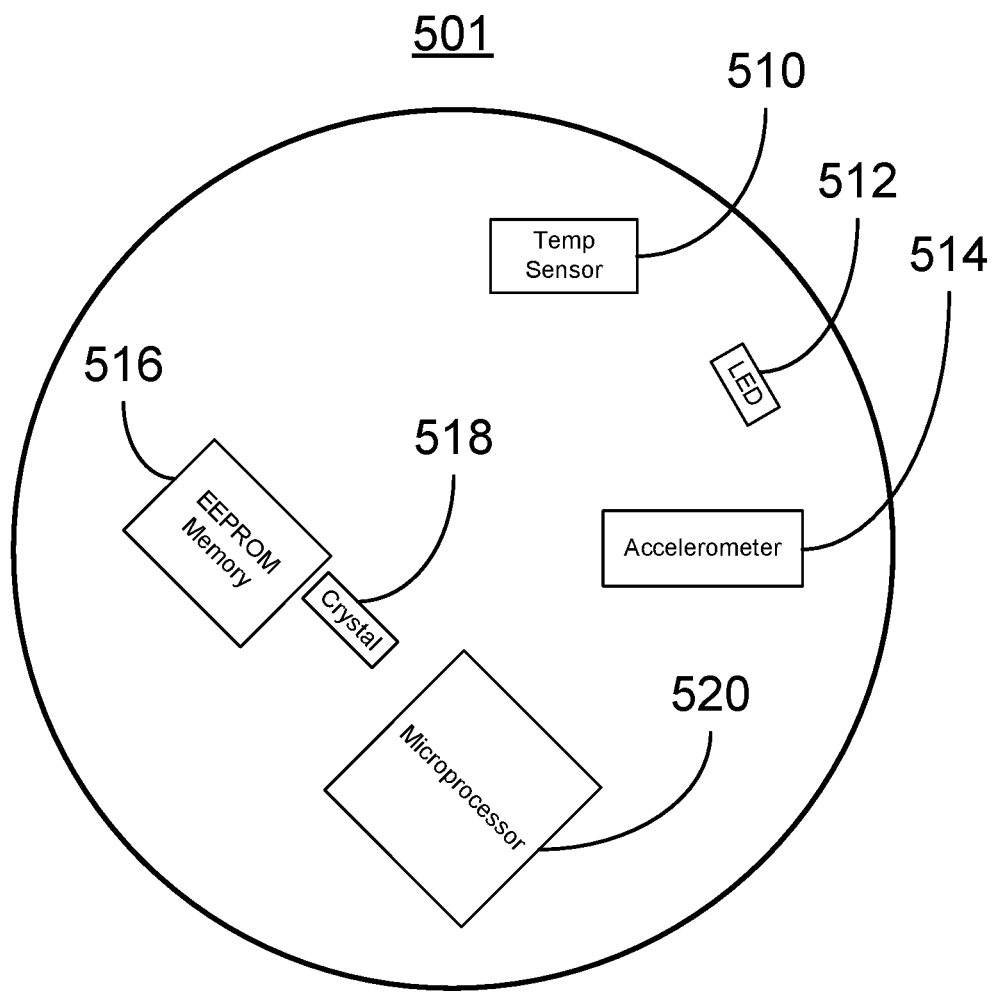

FIG. 5 depicts some examples of the central elements of the circuit board 276 consistent with embodiments of the present invention. The circuit board 276 has a plurality of central elements on a top surface 500 and a bottom surface 501, among standard essential elements such as resisters, capacitors, etc. With reference to the top surface 500, a transceiver chip 506 is directly connect to the microstrip transmission line 216 via the circular ground plate 270, a crystal 502, a radio amplifier 504 and an optional Surface Acoustic Wave (SAW) filter 508. The bottom surface 501 includes a temperature sensor 510 (that can measure the temperature of the cow 102), and accelerometer 514 that senses g-force (e.g., when a cow 102 is lying, eating, drinking or moving around), microprocessor and real time clock 520 (which handles the computing of the bolus 200), memory 516 to store sensor data, received data (such as calving date, cow mensis for cow insemination, illness, treatment, drugs administered, sire, dam, etc. all of which can be transmitted to a host, such as a dairy) and retain identification information and an optional LED 512 to indicate that the circuit board 276 is working. The circuit board 276 is powered by the battery 280. The main circuit board 276 fits on top (or inside the) diameter of the metal cylinder 290 of the bolus 200. Though not shown, the circuit board 276 includes a perpendicular "feed" conductors that pass ground to the microstrip transmission line's ground plane 214 and the radio energy from the transceiver chip 506 to the dipoles 205 and 207.

Certain embodiments contemplate the chipset configured with circuitry that balances, or tunes, at least the H-antenna 221 (and in some embodiments the cylindrical antenna as well) to a dielectric constant of cow's tissue, which is similar to saltwater concentrate. In other words, the H-antenna 221 is made to operate over a narrow impedance bandwidth accommodating the dielectric environment of a cow 102. This can be accomplished with integrating passive components to the antenna structure that facilitates near optimal energy transmission from the transmitter to the complex impedance of a cow's stomach. When the antenna 221 and 223 is in free space (in air with a dielectric constant of approximately 1.05), the antenna frequency of operation increases, and in turn produces a large mismatch, which decreases the transmitted power (in some cases by orders of magnitude) and thus reduces intentional and unintentional radiation when the antenna is outside of the cow 102 (or whatever the operating environment for which the antenna 221 and 223 is tuned). For example, with radio waves at a frequency of 915 MHz, blood has an epsilon of 61.3 and sigma is about 1.55. As is known to those skilled in the art, epsilon is the relative dielectric permittivity value, which is sometimes called the dielectric constant. Sigma is the conductivity. Certain embodiments contemplate the circuitry used for tuning the antennas being static, which is defined as circuitry that cannot be adjusted. While other embodiments contemplate dynamic circuitry that can be changed to alter the tuning of at least the H-antenna 221 depending on the condition with which it is confronted. In certain embodiments, the bolus 200 is tuned to radiate radiofrequency waves near optimal efficiency when passing through about 200 mm of cow before transmitting through air. This is about the thickness between where the bolus 100 sits in a cow's stomach and outside the cow 102. The antenna system, the H-antenna 221 and the conductive (metal) cylindrical antenna 223, can be tuned so that when outside of the cow 102 (before the bolus is disposed in a cow's stomach) the antenna system performs very poorly and limits the radiated radio power when not in the cow. In other words, the antenna only works well when the radio waves first pass through about 100 mm of cow before continuing to transmit through air. This is an important feature to avoid conflicting signals regulated by the Federal Aviation Administration (FAA) and other regulatory agencies.

FIG. 6 depicts dimensions of an embodiment of the H-antenna 221 consistent with embodiments of the present invention. In this embodiment, the electrically small H-antenna 221 possesses a first dipole 205 having an overall length of 24 mm and width of 1 mm and a second dipole 207 having a length of 24 mm and a width of 1 mm. The first parallel plate transmission line 210 has a width of 0.85 mm and an overall length of 24.5 mm. The microstrip transmission line 216 has a height of 6.8 mm and the width of 1.7 mm. The microstrip transmission line's ground plane 214 has a height of 6.8 mm and a width of 10 mm.

Figure 7:
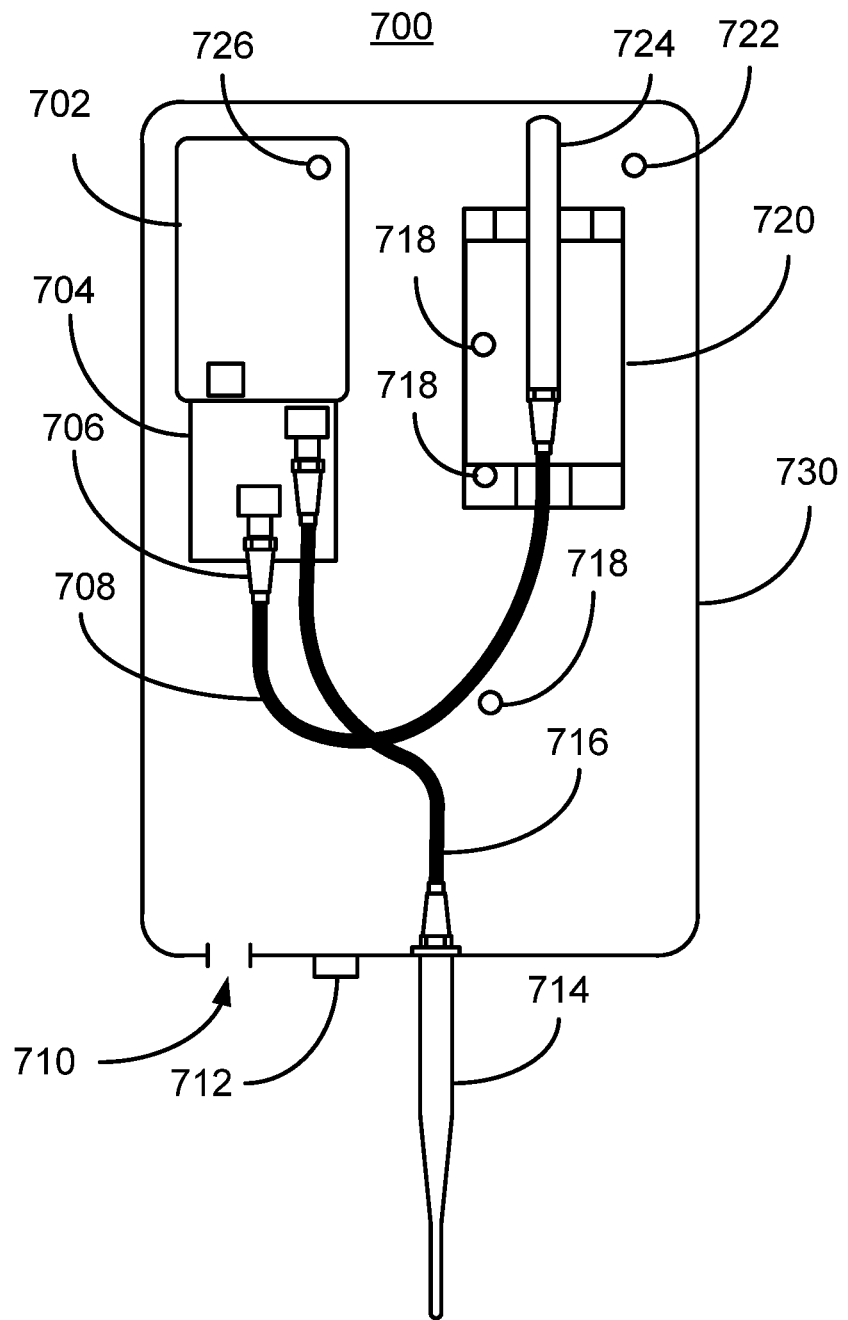
FIG. 7 depicts an embodiment of an external transceiver system in accordance with embodiments of the present invention.

FIG. 7 depicts an embodiment of an external transceiver system (AKA open-air transceiver) 700, which acts as a gateway between signals from the cow bolus 100 and data transmitted to a computing system (not shown) consistent with embodiments of the present invention. The external transceiver system 700 is configured for two-way communication with one or more boluses 100. Embodiments of the external transceiver enclosure 730 can include an enclosure that is suitable for mounting inside of a building and may be waterproof to withstand the elements outdoors. The external transceiver system 700 generally includes radio transceiver electronics, nonvolatile memory, microprocessor, real-time clock, connection to a single board computer, and other supporting circuitry. More specifically, the single board computer 702 serves as an interface between the main external transceiver system circuit board 704 (which can include in microprocessor and nonvolatile memory) and a client or host computer (not shown). The non-volatile memory can be used to store data received from the bolus 100 until the successfully passed to a host computer (not shown). The single board computer 702 facilitates data processing at the external transceiver system 700 in addition to a wide range of data formatting and physical layer data transfer, such as ethernet, cellular modem, long-range Wi-Fi interface, RS-232, laser data link, etc. The single board computer 702 is connected to the main external transceiver system circuit board 704. The single board computer 702 can have other features associated with it including a board power On LED 726. The single board computer 702 can also be used for data processing raw data received from the bolus 100 and other separated data collection/processing devices (e.g., tank level monitors, weather stations, video cameras) before processing and/or transmitting to a host computer (not shown). Moreover, the single board computer 702 can reformat data received from the bolus 100 and send it over a wide variety of interfaces (such as Ethernet, cellular modem, RS-232, long-range Wi-Fi, and others) to a host computer. Optionally connected to the single board computer 702 is a radio re-transmitter module (such as a long-range Wi-Fi transmitter module) configured to pass data collected by the external transceiver system 700 to a data collection center. This has additional benefits when the external transceiver system 700 is remotely deployed. Radio re-transmitter is connected to a Wi-Fi antenna 724 via a coaxial cable 708. Cables 708 and 716 are connected to various components via cable connectors 706. A drain/vent 710 can be located on a bottom side of the external transceiver system 700, which can be especially useful if located outside. Other elements can include a power switch 712, various status programmable LEDs, power On LED 722, for example. The external transceiver system 700 requires a power supply/source such as a battery, direct power line, solar, just to name several examples. In the present embodiment a solar DC power supply controller 720 is shown. The external transceiver system 700 can transmit and receive signals to and from a bolus 100 via the bolus radio link antenna 714, which is connected to the main external transceiver system circuit board 704. Certain embodiments envision the bolus radio link antenna 714 configured for receiving 915 MHz signals. Other embodiments contemplate the bolus 100 communicating with the external transceiver system 700 at a frequency above 800 MHz.

Certain embodiments of the present invention contemplate a bolus 100 for monitoring physiological data of a ruminant animal where the bolus 100 is administered to the animal down its esophagus. As previously mentioned, the density and size of the bolus 100 causes it to become trapped in one of the animal stomachs. The bolus 200 includes a microprocessor, memory, a resettable real-time electronic clock, bolus firmware that controls taking data from sensors integrated in the bolus 200, and a two-way radio transceiver that can send and receive data through the cow 102 and to a receiver station 106. The radio in the bolus 100 can be set to transmit at regular time intervals. Certain embodiments envision the receiver station 106 (or external transceiver) sending an acknowledgment message and an accrual age time and date message back to the bolus 100 when data has successfully been received at the receiver station. In this scenario, when the bolus 100 does not receive an acknowledgment from the receiver station, all data in the bolus 100 is stored in memory in the bolus within an accrual timestamp. At the next preset interval, all data in memory is transmitted. If acknowledgment is received by the receiver station 106, then the stored memory is cleared. If the acknowledgment is not received, then the latest timestamp reading is added to memory with a timestamp. The two-way communication also allows an end-user or host computer system to send a message to the bolus 100 (with the acknowledgment message) to do the following functions: change the transmit interval, change center reading interval (which may be different from the radio transmit interval), update the bolus firmware (adding new functionality to the bolus firmware), or turn on or off different sensors or functions in the bolus 100. To save battery power and to keep the radio channel clear, no data that has previously been successfully sent and acknowledged will be sent again.

Other embodiments contemplate the firmware controlling the bolus 100 can be programmed or updated where the taking of sensor data or the transmission interval is dynamic based on the sensor data. For example, instead of transmitting temperature and accelerometer data every one hour, sample the temperature and accelerometer data every 5 minutes and immediately transmit that data if the temperature is above 102° F. and/or if the accelerometer data is above 1 point 5 G's.

Yet other embodiments contemplate and accelerometer that can monitor the movement of the animal and the orientation of the bolus 100 and sudden jumps in g-force using sensors sampling methods that can be set and reset by the end-user by way of the two-way radio communication. The sensor can also be dynamically set by programmable logic in the bolus 100 that can be updated by two-way radio. For example, the bolus firmware can be set to sample the g-force of the accelerometer every 15 minutes for 15 seconds at high sampling rate of 10 times per second if the temperature of the animal is at least 1° F. above baseline temperature.

Certain embodiments contemplate the two-way radio connection use to command the bolus 100 to go from low-power radio transmissions while outside of the cow 102 to high power transmissions after certain amount of time has elapsed when the bolus 100 is implanted in the cow 102. This can be beneficial when the bolus operates in non-licensed frequency bands above 850 MHz.

Other embodiments contemplate an end-user or computer system using the two-way radio system to set or reset a sensor "alert" parameter (or logical condition using multiple sensors) that will change the bolus sensor sampling interval, or sensor transmit interval, or bolus on-board edge-computing data analysis. This can be furthered whereby the bolus data can be time stamped in the bolus 100, such that sensor sampling intervals can be changed to maintain a time synchronization that is not otherwise possible without on-board bolus time stamping.

It is envisioned that if a low-cost real-time clock is created inside of the microprocessor using its relatively low accuracy real-time clock functionality, the microprocessor real-time clock can be kept from drifting and becoming inaccurate by continually resetting the time within "accurate time" that is sent with each acknowledgment of receipt data from the receiver station 106.

Embodiments envision battery preservation whereby the bolus 100 consumes ultralow power when not sampling sensors or transmitting using the radio transceiver. This can facilitate extended life with no need to turn off the bolus 100 before administering the bolus 100 to the animal. When in this quiescent state (sleep state), the microprocessor disconnects all circuitry from the battery power source except power to the microprocessor. The microprocessor is then put in a "deep sleep" so that all microprocessor functionality is turned off except the necessary internal circuits to wake up the bolus 100 to take sensor readings at the reprogrammable interval or at a sensor event.

In some instances, it is contemplated that the two-way communication from the bolus 100 to the external transceiver station 106 can be used to write calibration coefficient data to the bolus 100 that can be utilized by an onboard bolus algorithm to adjust sensor readings to calibrated standards providing higher accuracy sensor readings. The sensor readings as well as other data transmitted by the bolus 100 can be passed to a host computer (not shown).

Another aspect of the present invention envisions dynamically tuning an antenna device while in vivo consistent with embodiments of the present invention. As used herein, dynamically tuning an intended device while in vivo refers to a process of dynamically tuning an antenna, such as the H-antenna 221 or a different antenna, while in a living organism. As previously discussed, monitoring a living organism by way of an implantable or otherwise wearable transmitting device can provide great value, especially if it is done in real-time or near real-time. For reference, an animal is a self-locomotion living organism, which of course includes humans as well as animals biologically defined by the animal kingdom.

One problem with implantable radio devices, such as a generic bolus (not shown) or other implantable devices, is that they cannot take into account tuning changes due to changes in dielectric effects of an animal because their antennas are statically tuned. For example, the dielectric constant of a cow rumen is about 67 in contrast to air which is close to 1 (a dielectric constant of 1 is defined for a vacuum). When an antenna is submerged in a material (e.g., a cow 102) with a higher dielectric constant than 1, the tuning frequency will naturally be lowered. In such an environment, the antenna naturally deviates from an optimal theoretical tuning which effects the available transmission power due to some amount of reflection back into the transmitter. In other words, the available transmitted power (also known as the incident power) will increasingly be reflected back through the antenna instead of being emitted through the dielectric material, which gets worse as the antenna drifts further and further away from being optimally tuned. The effect of this is that the signal range will be reduced and in some cases (when the antenna is poorly tuned with high reflection) will be reduced significantly.

Because implantable devices once deployed (e.g., inside of a cow 102) become inaccessible, it is highly difficult to appropriately tune the antenna in anticipation of the recipient's dielectric constant. The best that can be done is to engage in time-consuming "trial and error" approaches which, for example, can include implanting a device within a cow 102, measuring performance, take out of the cow, tune, repeat, approach optimization. However, even with this approach one cannot take into account how tuning may change based on different cows, stomach contents, or orientation of the device (and therefore orientation of the signal transmitting from the cow 102), to name a few factors.

Figure 8:
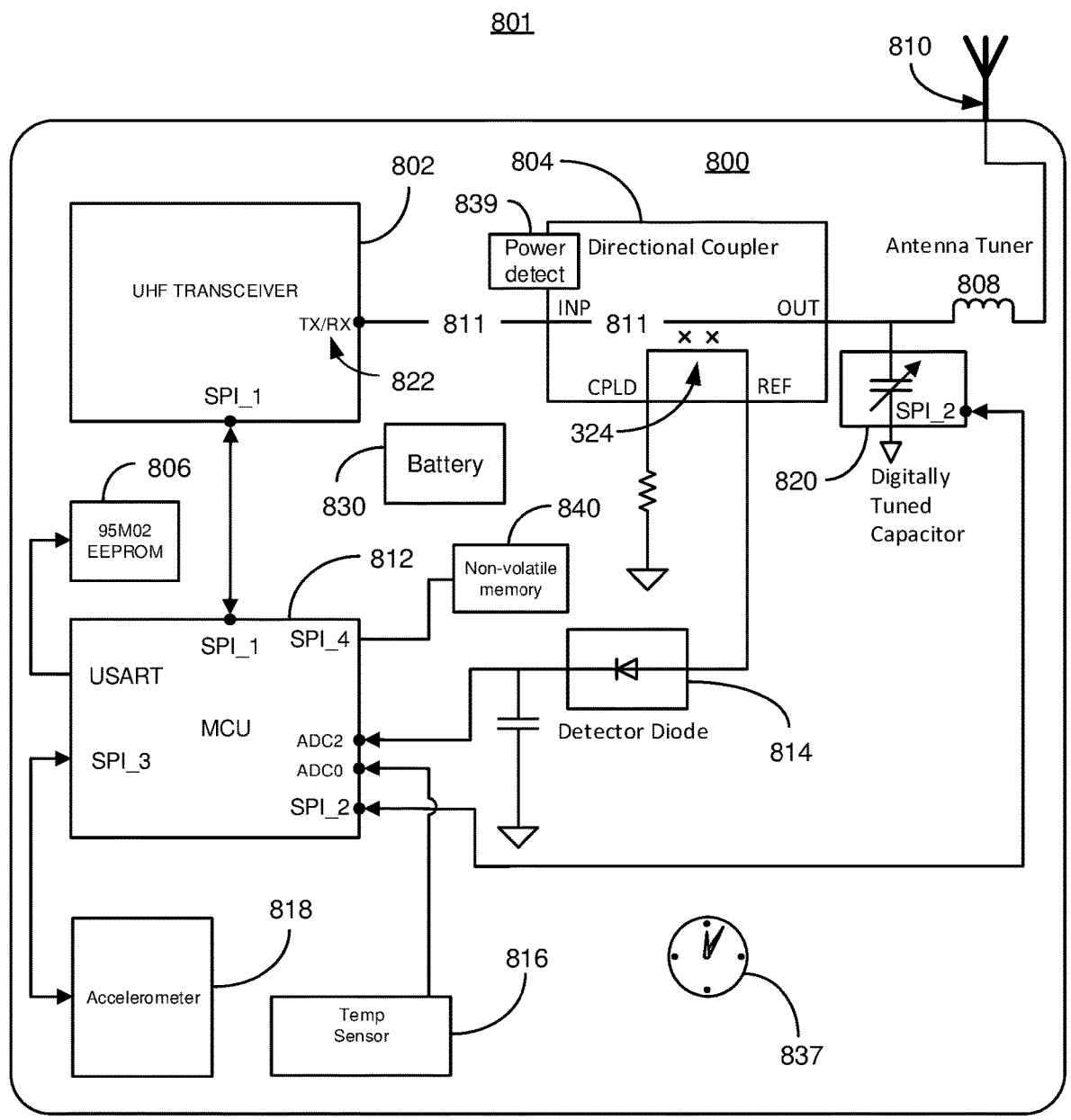
FIG. 8 depicts a block diagram of a simplified auto-tunable transceiver circuit board consistent with embodiments of the present invention.

FIG. 8 depicts a block diagram of a simplified auto-tunable transceiver circuit board consistent with embodiments of the present invention. The autotune antenna layout 800 embodiment is well suited for the bolus 100 when functioning inside of a cow 102. A fundamental advantage of an auto-tunable transceiver is when an RF signal is transmitted in vivo from a cow 102, or other animal, the tuned transceiver will transmit a signal at essentially the furthest, or nearly the furthest distance possible. As previously discussed, implantable and wearable sensing devices for animals providing remote monitoring are advantageous over manually monitoring animals for many reasons (such as improved data collection accuracy, the variety of attributes monitored, not to mention the simple feasibility of monitoring a large herd of animals).

Figure 9:
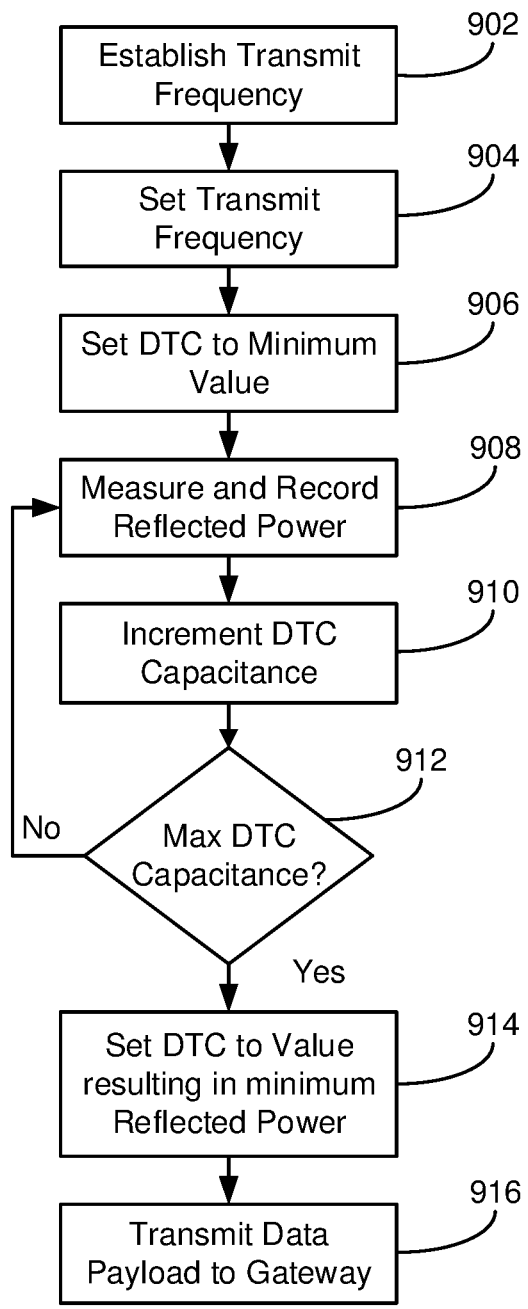
FIG. 9 depicts a flowchart of method steps to practice auto tuning a tunable transceiver consistent with embodiments of the present invention.

The functions of the auto-tunable transceiver circuit board of FIG. 8 are described in view of the method block diagram depicted in FIG. 9. The autotune antenna system 801 can be represented by general components depicted in the simplified autotune antenna layout 800, which can include a microprocessor/microcontroller 812, transceiver 802, signal reflection sensor 804, a variable tunable circuit or circuit component 820 (such as a variable/tunable capacitor, inductor, or another electrical component that can produce the same or similar outcomes within the scope and spirit of the present invention), antenna tuner 808, antenna 810, remote power supply 830 (which powers all of the components), and transducers/sensors 816 and 818. Other embodiments contemplate different components, components that are combined, different layouts or elimination of certain components within the scope and spirit of the present invention. The microcontroller unit (MCU) 812 provides the computing power to control much, if not all, of the activity and functionality of the autotune antenna system 801. In the present embodiment, the autotune antenna layout 800 is on a single printed circuit board, but that is not a requirement. Hence, certain embodiments envision elements and/or functionality on separate printed circuit boards without departing from the scope and spirit of the present invention.

With more detail, the MCU 812 initiates an "antenna-tuning" radio transmission defining transmission frequency, duration and power levels with the intent to "tune" the antenna 810, step 904. This is based on establishing a transmission frequency (step 902), which could be internally devised or based on a frequency change request from an outside communication source, such as an external transceiver 106 requesting a particular frequency to communicate. Data is typically not sent during this antenna-tuning radio transmission. Meanwhile, before, or after step 904, the MCU 812 sets the digitally tuned capacitor 820 (comprised by the variable tuning circuit, which in some embodiments may solely comprise a digitally tuned capacitor or some other device, such as an inductor, or something else or some combination of components fulfilling the function described herein) to its minimum value by way of commands through a communication line via interfaces SPI_2 (serial peripheral interface 2), step 906. MCU SPI_1 (serial peripheral interface 1) connects and communicates with the transceiver 802 at transceiver SPI_1 over which a "transmit" digital signal (command) is sent. In response, the transceiver 802 generates a radio wave at a "set" frequency and power level and then sends the radio signal from its transmit/receive port (TX/RX) 822. More specifically, a power transmission at a certain frequency is transmitted to the antenna 810 while residing in an animal in vivo. The radio wave can optionally be amplified via a transmit amplifier (not shown). Regardless, the transmission power which follows a path along the power line 811 can be sampled via the energy coupler 324 (denoted by the "x x" 824) at the directional coupler 804 and then sent to the power detector 814 which rectifies and converts the sampled power into a DC voltage that can be measured by the analog-to-digital converter at register 2 (ADC2). Hence, the digital voltage level going to the antenna 810 can be measured and retained in memory 806 or 840 for later comparison. Going back to the transmission power along the power line 811, after optional filtering and conditioning passes by the antenna tuner circuit 808 and transmission radio power (also known as incident radio power) is transmitted via the antenna 810 and through the animal 102.

When the transmitted, or incident, radio power hits the antenna 810, some of the power will not be transmitted through the dielectric medium (e.g., the cow 102 in this example), but will be reflected back down the antenna and into the digital tuned circuit 808. The reflected energy is also referred to as "return loss" as the signal bounces back (reflected back into the antenna 810). Technically speaking, the "return loss" is typically measured as the ratio of the reflected power over the incident power. The reflected energy/power is sampled by the energy coupler (x x) 824, rectified and converted at the power detector 814 and sent to ADC2, step 908, whereby the (return power value) result is then stored in either volatile memory 806 or in some embodiments nonvolatile memory 840. In some cases, if the incident power is known, only the reflected power/energy need be measured. Accordingly, the "return loss" can be seen as reflected power level compared to either a measured power level from the transmitter 802 or compared to a set (consistent) power level that the transmitter 802 is intended and made to transmit. The reflected energy/power is compared with the transmission power by the MCU 812 whereby the MCU 812 can then adjust the digitally tunable capacitor 820 via the SPI_2 port residing at both the MCU 812 and the digitally tunable capacitor 820. Certain embodiments envision incrementing the digitally tuned capacitor 820 in increasing increments from a lowest capacitor level (or lowest present level/starting point) until the digitally tune capacitor essentially maxes out or otherwise reaches a preset limit, step 910. Once done, the MCU 812 initiates another "transmit" digital signal (command) to the transceiver 802 which transmits at an increased capacitance level (or range in some cases) and the process repeats until the digitally tuned capacitor 820 it is adjusted to a maximum (or maximum preset) capacitance, step 912. By repeating these steps 908-910, a table of incremental capacitance values versus reflection losses can be established and stored in the EEPROM 806 (or long term memory 840), for example. The EEPROM 806 provide some advantages in that the contents can be erased and reprogrammed using pulsed voltage which is appropriate when a new frequency needs to be evaluated. By sweeping through a plurality of incrementally increasing capacitance from minimum to maximum, the MCU 812 can determine which capacitor setting resulted in the minimum reflected power, which in this case represents essentially the furthest transmission distance a signal can be transmitted thereby improving data transmission in ensuing transmissions. Once the minimum reflected power value is established, the digitally tuned capacitor 820 is set to that minimum reflected power value, step 914. When the antenna 810 is tuned with the minimum reflected power value, signals of measured results from the accelerometer 818, the temperature sensor 816, or some other transducer, such as a chemical sensor adapted to sense the presence of chemicals in vivo (not shown) will then be transmitted to a receiver outside of the animal 102 in a more optimal transmission, step 916.

Certain embodiments envision iterating the digitally tuned capacitor to perform at near optimal performance. Because optimal performance can never actually be met, a near optimal performance can be settled on within some gradation of voltage being sampled, such as the number of decimal points deemed acceptable by the engineering designer known to those skilled in electrical engineering arts (whether 1, 2 or 10 decimal points to the right of the voltage transmitted, for example).

In the embodiments of FIGS. 8 and 9, the microprocessor 812 supports the adequate controller instructions (or code) to manage and control the steps described above.

Figure 10:
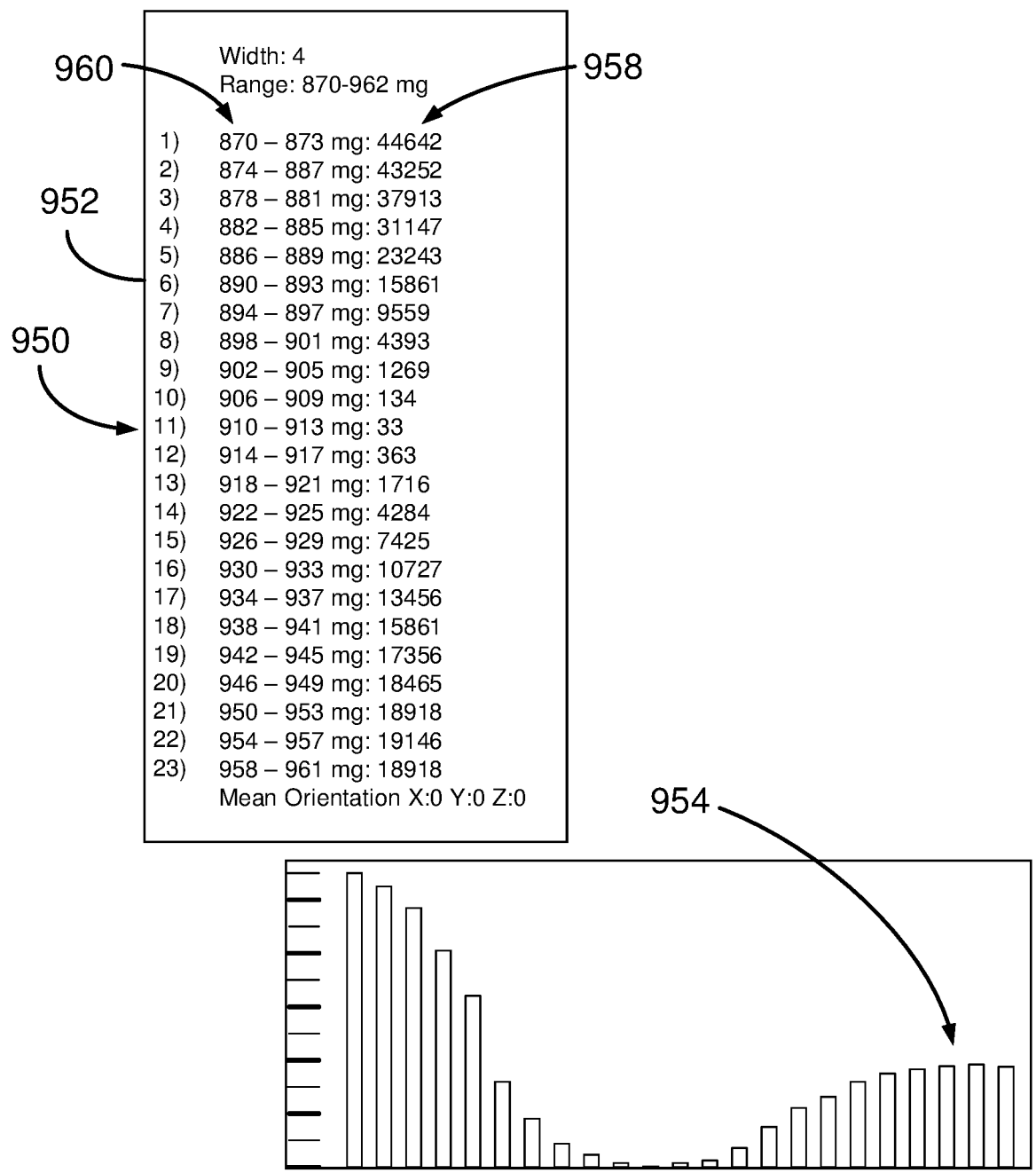
FIG. 10 illustratively shows and actual computer display of determining and optimal transmission frequency.

FIG. 10 depicts a computer display "screenshot" of a table associated with establishing an optimal frequency range to transmit signals from a bolus in vivo consistent with embodiments of the present invention. In this illustrative example, the table 952 indicates frequency 960 versus reflected power 958 over a range of varied frequencies, as opposed to a common frequency with varied capacitance as illustratively described in FIGS. 8 and 9. The concepts of FIGS. 8 and 9 can equally be shown by a table of varied capacitance for a single frequency similar in concept to FIG. 10. As shown in FIG. 10, the reflected power is detected, filtered and input into the MCU ADC_2. By sweeping the frequency 960 across a band of interest (in this case 870-962 MHz which is referred in the figure as 'mg') in increments of 4 MHz (Width: 4), the results show it is possible to determine where the near/essentially optimum (or an attempted effort to be optimal) tuning band 950 occurs. In this case, the optimal tuning band for this in vivo bolus is 910-913 MHz with a low RF signal reflection value of 33. A bar graph 954 illustratively shows the minimum RF signal reflection. Though embodiments described herein rely on the MCU 812 to optimize the autotune antenna system 801, the information can be optionally transmitted to a gateway transceiver 106 for manual intervention to choose an optimal, or near optimal, tuning or yet another option is for intervention to set an optimal, or near optimal, tuning by a computing system remote to the bolus 100.

The initiation of an antenna tuning process may be done in many ways including at periodic time intervals that are controlled by a clock 837, by using sensor data from analog sensors or digital sensors, prior to any transmission, by a signal from an external device in a 2-way system, just to name one. Other embodiments of the invention may include a power detection circuit 839 (that measures power output of the transmission signal) between the transmitter 802 and the antenna 810.

One valuable aspect of power detection circuit 839 circuit is for diagnostic purposes. The power output is sampled and converted to a DC voltage by Detector 814 (or some other detector) which is then sent to ADC_2 or other Analog input to the MCU 812. The MCU 812 can then have the data to a) determine how much actual transmission power the transceiver 802 is putting out when sending a signal, and b) determine if there is a big difference in power from the level of power that the MCU 812 requested the transceiver 802 to send. This feature can be a valuable diagnostic tool, especially in sensors (such as sensors 818 and 816) that are inaccessible due to being inside of an animal. The power level that the MCU 812 commands the transmitter 802 use when transmitting a signal and the power level measured by the power detection circuit 839 (power-data) can be included in a data packet and transmitted wirelessly to a receiving party, such as transceiver 106.

Power data can be used for diagnostic purposes, such as to determine if the circuit is operating properly in both a manufacturing test (prior to use) and as a field diagnostic tool when a bolus 100 and more specifically an autotune antenna system 801 is not working as expected in the field. In some embodiments, since the power detection circuit 839 is part of the wireless transmitter system 801, all of the circuit data generated by the auto-tunable transceiver circuit 800 may be transmitted wirelessly to a receiving party (during manufacturing testing or when inside a body, in vivo) to gain insight on the performance of the wireless transmitter system 801. This may lead to improving or even optimizing the auto-tunable transceiver circuit 800 or elements therein and perhaps to resolve problems with the auto-tunable transceiver circuit 800. This circuit data may include: a) capacitor value verses reflected energy at each frequency, b) radio power output verses an analog battery voltage measurement or other analog sensors data, c) monitoring the changing dielectric properties of body parts (or in this case cow 102 parts) by monitoring the most optimally found capacitance setting over time, d) monitoring the effect of outside influences on the cow's dielectric properties (such as lying on the ground) by monitoring the change in the most optimally found tuning capacitance verses the activity of the cow 102, and e) detecting events inside the cow 102 (such as eating or drinking or dehydration) by monitoring the change in antenna tuning capacitance in different parts of the cow, cow's body (such as the stomach). In some embodiments, the circuit data from the power detection circuit 839 and antenna tuning data that is wirelessly sent may be used to make improvements in the controlling firmware that is in the non-volatile memory 840. In some embodiments, the firmware can be improved or new special tests can be added by having an outside transceiver or transmitter (such as the external transceiver 106) wirelessly send/transmit new firmware to the autotune antenna system 801, followed by loading the new firmware in the MCU memory 840 by utilizing a "boot loader" in the MCU memory 840, for example.

As discussed supra, the autotune antenna system 801 is well suited for adjusting to the different dielectric constants from different part body parts that may affect antenna tuning. The autotune antenna system 801 is further well-suited for adjusting to the effects of ingested food, drinking, or some other change in the dielectric properties of the medium for a signal being transmitted through, such as the stomach of a cow 102. The autotune antenna system 801 is well suited for dielectric properties of varying factors in an animal such as size, age, body parts in the vicinity of the bolus, and species of the animal. Certain embodiments further envision the autotune bolus retuning at predetermined times due to the fact that the constantly changing dielectric environment causes the antenna to de-tune thereby causing poor or suboptimal performance.

Though the autotune antenna system 801 provides improved signal transmission through signal-impeding media, such as animal tissue, certain optional embodiments envision extending communication reach (signal transmission distance) by turning up the transmission power of the bolus 100 or some other embedded transceiver 130. However, simply turning up transmission power to extend communication reach has added complications that include transmission sequences regulated by international communication authorities. As will be discussed below in more detail, the regulatory transmission sequences require additional power to operate, which is a drain on battery power. Because many of the envisioned embedded transceivers 130 comprise a battery that is essentially irreplaceable and unable to be recharged, their life can be significantly impacted by these regulatory transmission sequences. Managing power usage while turning up transmission power is discussed in more detail in conjunction with FIGS. 11A, 11B, 12, 13A and 13B.

Figure 11A:
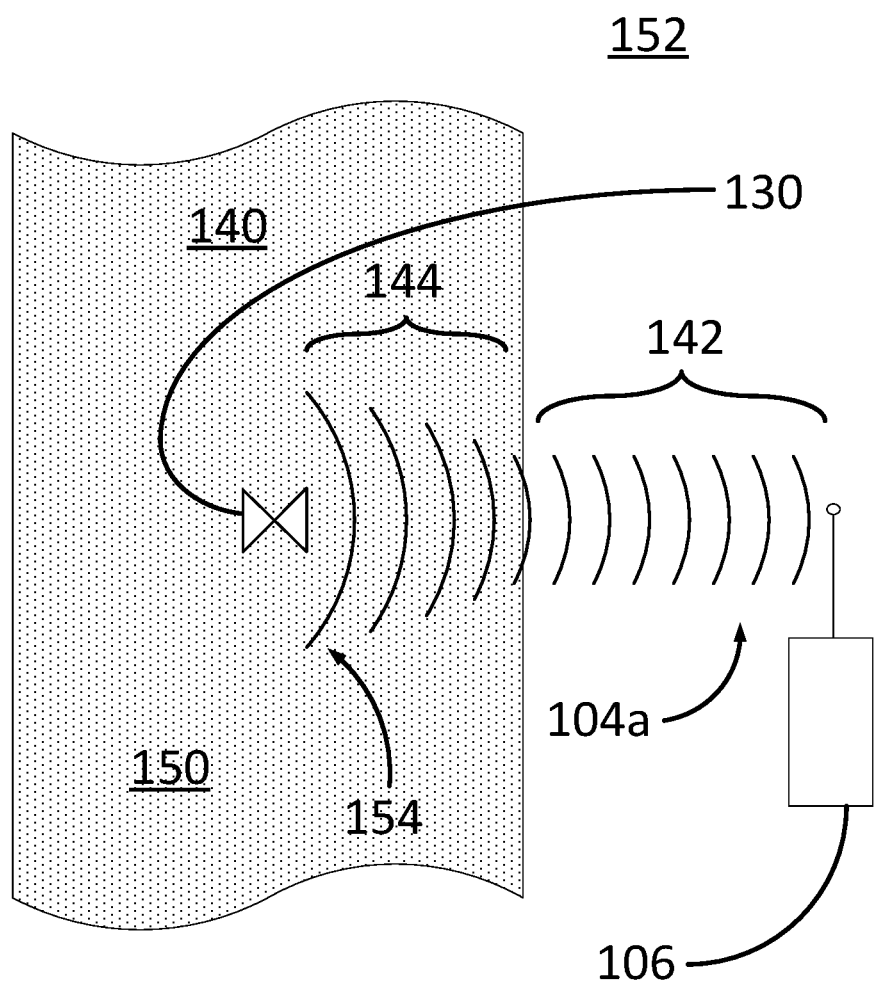
FIGS. 11A and 11B are line drawings of an embedded transmitter illustratively depicting RF signal attenuation transmitting through an attenuating medium consistent with embodiments of the present invention.
Figure 11B:
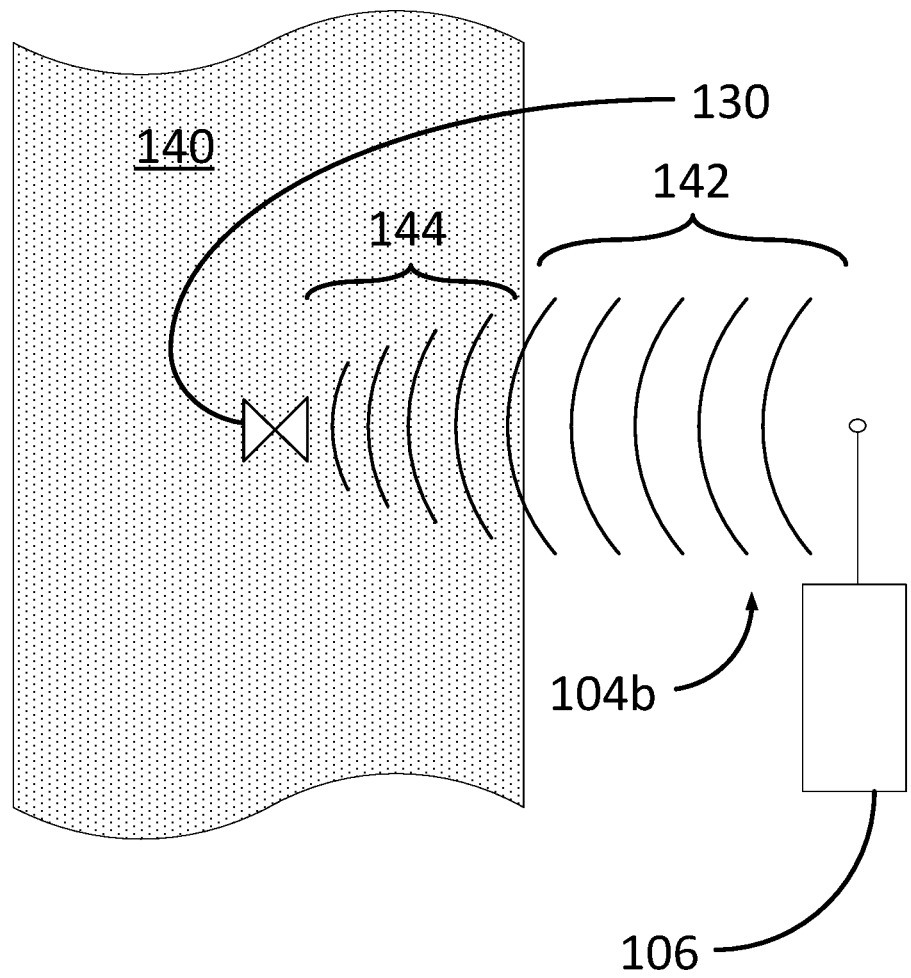

FIGS. 11A and 11B are line drawings of an embedded transmitter illustratively depicting RF signal attenuation transmitting through an attenuating medium consistent with embodiments of the present invention. FIG. 11A depicts an embedded transmitter 130 embedded in a concrete block 140 while transmitting an RF signal 104a (outgoing signal). The concrete block 140 is one embodiment of an RF signal attenuating medium 150, or simply "medium". The concrete block 140 can be a section of a concrete in a building 132 (exemplified in FIG. 1C), such as a wall structure, slab, pylon, footer, or a segment of a bridge, road, etc. Other RF signal attenuating media can include gels, liquids, metals, composites, foams, or just about any medium that attenuates a signal (power) of more than 3% per foot. Accordingly, an attenuating medium 150 can be stationary, like in a building, or mobile, like in a machine or animal just to name several examples. A bolus 100 (of FIG. 1) is an exemplary embodiment of an embedded transceiver 130, however as shown conjunction with FIGS. 2C and 11A, other kinds of embedded transceivers can be used for specific applications without departing from the scope and spirit of the present invention.

Similar to the elements described in conjunction with the bolus 100, a generic embedded transceiver 130 of FIGS. 11A and 11B can comprise one or more sensors, a microprocessor, RF transceiver and antenna, battery, memory and other associated electronics contained in a housing. In certain embodiments, the sensor/s are configured to monitor and convert physical parameters, such as temperature, pressure, strain, g-forces and other object parameters to an electrical signal that are transmitted outside of the embedded transceiver 130 via an RF signal 104b. In some embodiments, the transmission is in the form of a data packet that is sent to an open-air transceiver 106. To streamline communication and power consumption, after the open-air transceiver 106 receives the data packet, the open-air transmitter 106 can respond back to the embedded transmitter 130 with an acknowledgment of data packet receipt (ACK), which assures receipt of all the data transmitted. As should be appreciated, the two-way communication between the open-air transceiver 106 and the embedded transceiver 130 enables software updates to be made to the embedded transceiver 130. Software updates can include firmware changes, format changes, etc., just to name a couple of examples. In the event there is no ACK from the open-air transceiver 106, a resend routine inside of the embedded transmitter 130 can be executed to resend the data packet either immediately or after a predetermined period of time, such as in 5 minutes, for example. The resend routine, which is based on the failure of an ACK receipt, compensates for situations when an embedded transceiver 130 goes out of an open-air transceiver's 106 range, such as if a cow 102 wanders out of range of an open-air transceiver 106.

With continued reference to FIG. 11A, as depicted the RF signal strength rapidly weakens or otherwise attenuates until the signal hits open-air 152. More specifically, the RF signal 104a attenuates in a region of attenuation 144 inside of the medium 150, but when the RF signal 104a reaches open-air 152, there is little to essentially no RF signal attenuation, as shown by the open-air region 142. FIG. 11B shows the reverse of FIG. 11A in that the embedded transceiver 130 is receiving an RF transmission from the open-air transceiver 106, which attenuates significantly (above 3% per linear foot) when the radio waves hit the attenuating medium 150. Certain embodiments envision that in order for an RF signal 104a to be strong enough to reach an open-air transceiver 106 (or the reverse as in FIG. 11B), the output transmission power 154 must be above a threshold power as defined by mainstream international RF regulatory agencies.

Mainstream RF regulatory agencies include the Federal Communications Commission (FCC) in the US and the National Radio Frequency Agency (NRFA) in Europe. Mainstream RF regulatory agencies adhere to an RF regulatory requirement or agreement known as the International Telecommunications Union's Radio Regulations. These RF regulatory requirements impose limitations on certain physical properties of generated electromagnetic radiation, wherein some specifically limited properties are frequency, power, bandwidth, and duty cycle. The regulations are intended to foster sharing the RF spectrum harmoniously, which is fast becoming a very limited resource. These regulations dictate that if the output transmission power 154 is above a threshold power of 0.25 Watts, the transmissions are subject to channel hopping requirements. As mentioned, collaborating countries regulate the frequencies that operate above radio power threshold levels in an attempt to optimize the "airways" for public use. In the US, the 900, 2400 and 5000 MHz frequency bands are set aside by the FCC for unlicensed Industrial, Scientific and Medical (ISM) devices and applications. Despite the fact that ISM frequency bands are open to the public without a spacial license, users must prove that their ISM devices meet the restrictions set by the RE regulatory requirements. For example, in the United States, radios may be developed and sold using an ISM band providing that the manufacturer proves to the FCC that their system meets FCC RF regulatory requirements.

The most commonly used ISM frequency bands in the United States are 415 MHz, 902 to 928 MHz (915 MHz band) and 2.400-2.4835 GHz (2.4 GHz band). The frequency bands 915 MHz and 2.4 MHz are considered a "higher frequency band" and the 415 MHz band is considered a "lower frequency band". There are specific rules about the transmission frequency and allowable radio signal power levels for each of these bands. The general idea is to allow many different devices to work in the same frequency band. This is typically achieved by a) limiting the output transmission power level so that radio transmitters (radios) are "short range" and/or b) at above threshold output transmission power levels, limiting the amount of time that a radio can transmit on a certain frequency channel within an ISM radio band. Accordingly, the frequencies that allow higher RF transmission power, such as the higher frequency bands 915 MHz and 2.4 GHz, require hopping or otherwise "frequency spreading" when the higher transmission power levels are used, such as 1 Watt. In this way, one ISM system communicating at the same time with another ISM system will avoid interference or collisions because they will be communicating over different channels, albeit in the same frequency band. Even if hopping is not required by regulations, it is still advantageous to hop on a few channels to avoid interference. Even when the open-air transmission power is low or there are no regulations, some embedded ISM radio systems may choose to hop on some different number of channels, such as 5 channels, instead of just transmitting on 1 channel. This improves radio reliability at a small cost of increased battery usage and reduced receiver availability, where the open-air power is very low.

For example, FCC rules require that ISM devices operating in a higher frequency band, such as 915 MHz band (902 to 928 MHz), are only allowed to transmit a maximum power (1 Watt) within a predetermined time interval, hereinafter referred to as a time window. The FCC stipulates that the transmission time window is an interval of no more than 0.4 seconds on one frequency before the radio must "hop" to a different frequency in the same band. Hence, if an ISM radio initially transmits on a 902 MHz frequency channel at a high power of 1 Watt, after 0.4 seconds the transmission must shift to another frequency channel, e.g., the 914 MHz channel. Generally speaking, 1 Watt of power is used for long-range applications for long-range ISM radios, which adds to the complexity of a radio system because of the frequency hopping management. In addition, the FCC rules require "pseudo-random" channel hopping, which further complicate the system.

At maximum allowable power in the higher frequency band, e.g., 915 MHz band, the FCC requires that the ISM radios hop across 50 channels, i.e., change frequency channel at the time window of 0.4 seconds. At very low power levels, the FCC allows single-channel transmissions. At medium power (0.25 Watts at a lower frequency bandwidth of 250 kHz to 500 kHz), the FCC requires that the radio hop across 25 channels. The bandwidth of the channel can also dictate how many channels are required. For example, if the bandwidth of the channel is less than 250 kHz, the system must use 50 channels.

High power frequency bands used in ISM applications, such as 915 MHz and 2.4 GHz, require hopping or other "frequency spreading" when high-power levels (above power threshold) are used. Hence, embedded wireless sensor systems operating in a mainstream RF regulatory agency country need to employ frequency hopping or frequency spreading when above threshold ISM transmission power is above the designated threshold, e.g., when maximum ISM radio power is used to achieve maximum radio transmission distances.

With respect to channel hopping, when an embedded transceiver 130 sends data on a particular channel, the open-air transceiver 106 must be tuned to the channel to receive the data. For ISM threshold power of 1 Watt, the higher frequency band of 915 MHz uses 50 channels. Channel hopping using a preamble is robust and reliable and avoids the need for precise channel hopping timing between the embedded transceiver (acting as a transmitter) 130 and the open-air transceiver (acting as a receiver) 106. The preamble is a collection of possible channels over which the embedded ISM device 130 will transmit data and informs the open-air transceiver 106 to limit scanning to only those channels. In the case where the preamble is 50 channels, the open-air transceiver 106 will know to only scan for those 50 channels.

Considering a situation with a herd of cows each carrying a cow bolus 100, syncing a transmitter and receiver when there may be hundreds of cow boluses trying to talk on 50 different channels to one open-air transceiver requires a long (50 channel) preamble message. The FCC requires ISM radios to each send a long "preamble" message on their transmit channel before any data is sent. For a specific cow bolus 100, the open-air transceiver 106 scans all 50 channels and locks-on to the preamble before the cow bolus 100 starts to send data. The preamble needs to be long enough so that the open-air transceiver 106 can scan all 50 channels. For example, if it takes the open-air transceiver 106 0.002 seconds to move from a first channel to a second channel and listen to the second channel, then it will take it 0.1 seconds for it to scan all 50 channels. This means that the cow bolus preamble needs to be at least 0.1 seconds long to guarantee that the open-air transceiver 106 will lock-on to the cow bolus 100 to receive the data. This long preamble lock-on with the open-air transceiver 106 listening across all 50 channels method is robust and reliable but takes a considerable toll on the embedded transmitter's battery life. Additionally, the open-air transceiver 106 spends much of its time scanning all 50 channels (around 25% of its time) and, therefore, is less available to receive messages.

Figure 12:
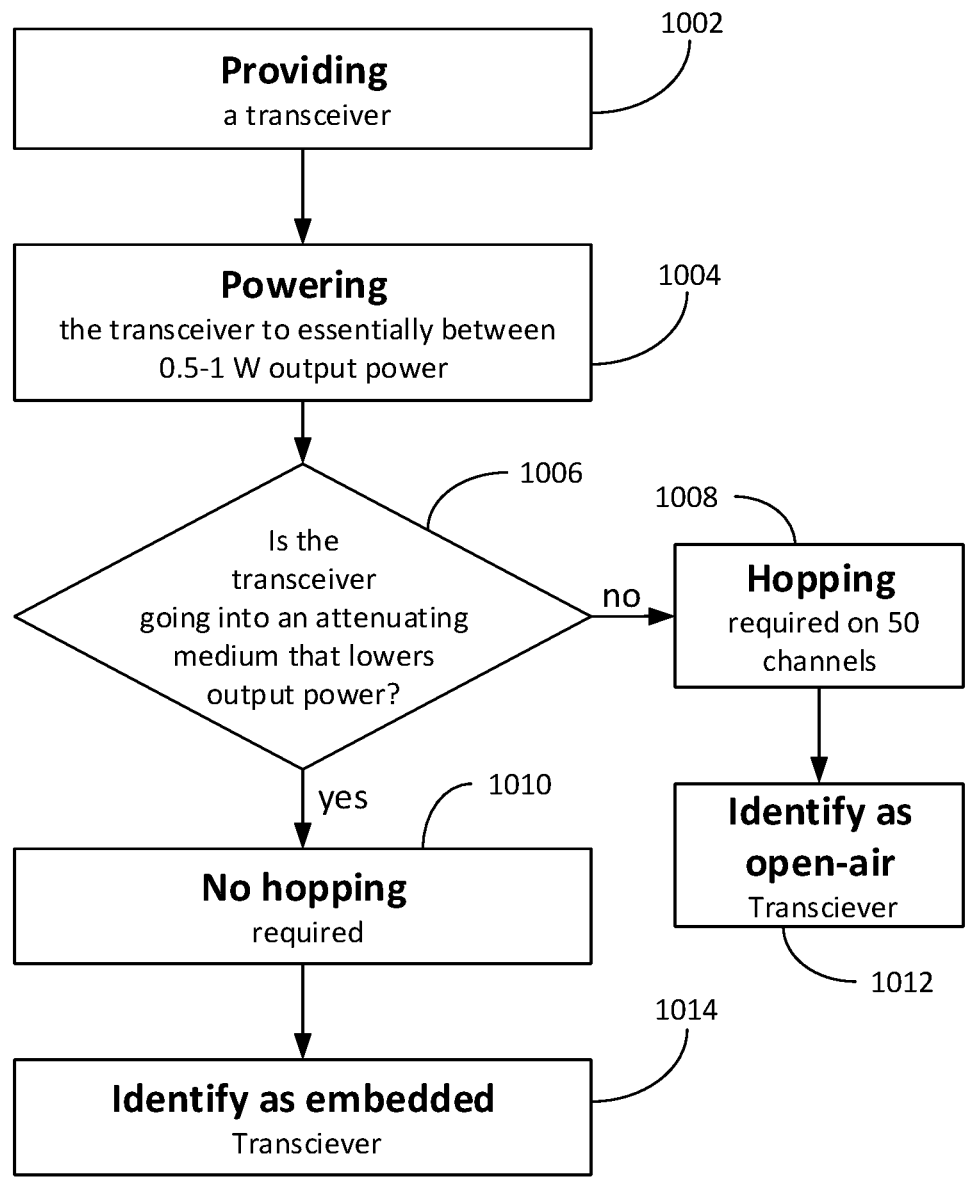
FIG. 12 is a flowchart embodiment directed to transmitting data using RF communication for embedded ISM transceivers consistent with embodiments of the present invention.

FIG. 12 is a flowchart embodiment directed to transmitting data using RF communication for embedded ISM transceivers consistent with embodiments of the present invention. It should be appreciated that inventive concepts described herein can be equally used with non-ISM embedded transceivers that face similar hopping challenges. FIG. 12 is described in view of FIGS. 11A and 11B and the current RF regulatory requirements. As shown in FIGS. 11A and 11B, the embedded transceiver 130 (which in this embodiment is an ISM embedded transceiver) is in two-way communication with the open-air transceiver 106, step 1002. In addition, as shown, the RF signals are highly attenuated when they travel through the medium (e.g., more than 3% signal attenuation per linear foot), whether in a direction towards the embedded transceiver 130 (incoming signal) or in a direction towards the open-air transceiver 106 (outgoing signal). The present arrangement contemplates powering both the embedded transceiver 130 and the open-air transceiver 106 essentially equally to between 0.5 and 1 Watts (or optionally at or above 0.25 Watts), step 1004. In the present embodiment, the open-air transceiver 106 and the embedded transceiver 130 must be powered to the same level in order for the systems to be communicatively matched. Accordingly, the two transceivers 106 and 130 are subject to and must adhere to the RF regulatory requirements that define particular protocols above and below a threshold power for RF transmission, or simply "threshold power". This scenario can be equally applied to a cow bolus 100, wherein the radio transmitter in the cow bolus 100 has to transmit through the highly attenuating cow body (i.e., cow stomach and through the cow tissue to the open-air 152). In this example, if the outward RF signal 154 (from the embedded transceiver 130 to the open-air transceiver 106) is attenuated to less than 0.25 Watts when the RF signal 154 hit the open-air 152 (region 142), then there is no hopping requirement. For example, the FCC requires hopping on one channel instead of 50 hopping channels. Optionally, if the attenuation in the medium 150 is minimal, the "open-air" power is less than 0.25 Watts and the channel bandwidth is at a lower frequency, 250 kHz to 500 kHz, the hopping is permitted to be reduced to 25 hopping channels. In the present example, the frequency band is in the higher frequency range.

Certain embodiments contemplate adjusting the power of the embedded transceiver 130 to an open-air transmission power of just under the threshold value to avoid channel hopping. For example, if the embedded transceiver 130 is powered at 1 Watt and the open-air transmission power is 0.28 Watts, it may be advantageous to lower the embedded transceiver power to 0.96 W so that the open-air transmission power is 0.24 Watts. In this way, the embedded transceiver 130 will be under the required channel hopping power and will facilitate improved battery life through the battery management non-channel hopping routines. Embedded transceiver power adjustment could be done before embedding the embedded transceiver 130 in a medium 150 (using an expected attenuation) or optionally after by way of communication with the open-air transceiver 106 (using real attenuation values). In some arrangements, the open-air transceiver transmission power will need to be adjusted to be essentially equal to the embedded transceiver transmission power, in order to power match the two transceivers 130 and 106.

The communication is greatly simplified when the hopping is done on one channel. Basically, the embedded transceiver preamble can be $\frac{1}{50}^{th}$ as long if the attenuation at high frequency is under 0.25 Watts. This saves battery power/life in the embedded transceiver 130 and it frees up the open-air transceiver 106 to receive data for at least 25% more time.

As shown in decision step 1006, if the ISM transceiver is embedded in an attenuating medium, such as a cow body or concrete for example, then the ISM transceiver will be used as an embedded transceiver 130. No hopping is required if the power in open-air 152 for the embedded transceiver 130 is below 0.25 Watts and the transmission signals are in the high frequency band range, step 1010 otherwise hopping is required, step 1008. Though hopping is not required, certain embodiments envision employing hopping techniques but at a reduced level, such as 5 hops, to help insure no collisions/interference from other devices. In this example, the open-air transceiver 106 requires hopping, step 1012, and the embedded transceiver 130 does not require hopping, step 114.

Figure 13A:
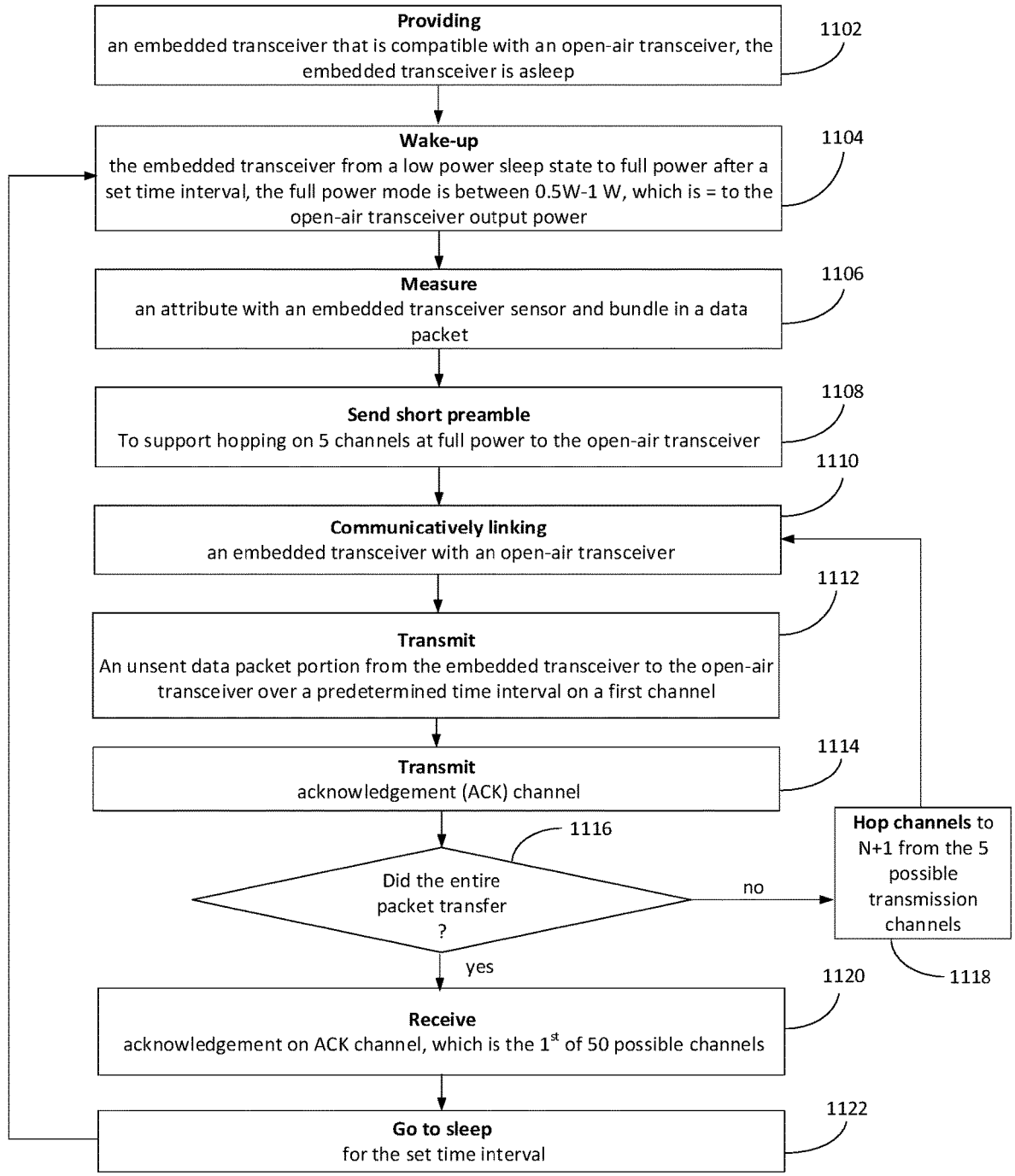
FIG. 13A is a flow diagram of how an embedded transceiver cooperates with an open-air transceiver consistent with embodiments of the present invention.

The block diagram of FIG. 13A is a flow diagram of how the embedded transceiver 130 cooperates or otherwise functions with the open-air transceiver 106 consistent with embodiments of the present invention. In step 1102, an embedded ISM transceiver 130 is communicatively compatible with the open-air ISM transceiver 106, i.e., they are configured to work together. The embedded ISM transceiver 130 is asleep to save energy because in this embodiment the embedded transceiver 130 is operated by battery power, wherein the battery is not replaceable. Hence, the embedded transceiver 130 needs only to be fully awake (running at essentially full power) during essential operations of taking a measurement and sending it, for example. The embedded transceiver 130 comprises a microprocessor that is in a quiescent state running a clock and minor routines.

After a predetermined amount of time, a minor routine running in the quiescent state wakes up the embedded transceiver 130, step 1104. When woken up, the embedded transceiver 130 is essentially fully operational with a transmission power of 1 Watt, which incidentally is what the open-air transceiver transmission power is. An end user can set a predetermined amount of time before the embedded transceiver 130 is embedded in a medium 150. Optionally, a predetermined amount of time can be adjusted by way of communication from the open-air transceiver 106. A predetermined amount of time when the embedded transceiver 130 is woken up can be whatever an end user wants, such as after 10 minutes, 1 hour, 1 day, etc.

In step 1106, while in a full powered state, the embedded transceiver 130 takes at least one measurement with the at least one sensor and converts that measurement into digital data. The measurement can be a temperature measured with a thermal couple or a pressure value measured with a pressure sensor, or both, or even something else depending on the type of sensor/s. In the case of a bolus, the sensors are in the housing or potentially exposed on the surface of the housing. The sensor data can be retained in onboard memory with software routines that manage the data, assemble transmission data packets, etc.

As shown in step 1108, a short preamble is sent at full power (1 Watt) to the open-air transmitter that is either constantly scanning for communication or is on a timer synced with the quiescent and active states of the embedded sensor 130. In the present example, the preamble comprises five hopping transmission channels, which has been voluntarily imposed to avoid collisions. Other embodiments envision a preamble of one channel. The preamble can be channel values that were previously input or channel values that are randomly generated. The open-air transceiver 106 is listening for a transmission and when it discovers the preamble transmission it starts scanning on the channels in the preamble to lock onto the embedded transceiver 130, step 1110.

In step 1112, while communicatively linked, the embedded transceiver 130 sends at least a portion of a data packet defined by the quantity of data able to be sent over a predetermined time window (such as between 0.3 and 0.4 seconds) before the embedded transceiver 130 needs to hop channels. For example, if 10 KB is transmittable within the predetermined time window, then each portion of a data packet will be 10 KB. If a data packet is 55 KB, then the data packet will be divided into 6 portions either equally or not. An ACK channel is included at the end of the portion of the data packet, which tells the open-air transceiver 106 which channel to send the acknowledgement. By sending an ACK channel, the open-air transceiver 106 knows what channel to send the ACK reply on thereby eliminating the step of scanning for 50 channels at the embedded transceiver end. For example, if the ACK channel is 14 then the embedded transceiver 130 listens for a response on channel 14, which is exactly the channel on which the open-air transceiver 106 sends the ACK. Hence, the ACK channel is the channel on which the open-air transceiver 106 sends an acknowledgement that the portion of the data packet has been received. The ACK channel number is sent to the open-air transceiver 106 so that this informs the embedded transceiver 130 that the data packet or the portion of the data packet was successfully received.

Assuming an ACK was sent by the open-air transceiver 106 and received by the embedded transceiver, step 1114, proceed to the question block 1116. Question block 1116 asks if the entire packet was sent. If no, go back to step 1110 and send another portion of the data packet but hop over to a different channel. If yes, go to sleep 1120 and proceed to step 1104 and repeat.

Figure 13B:
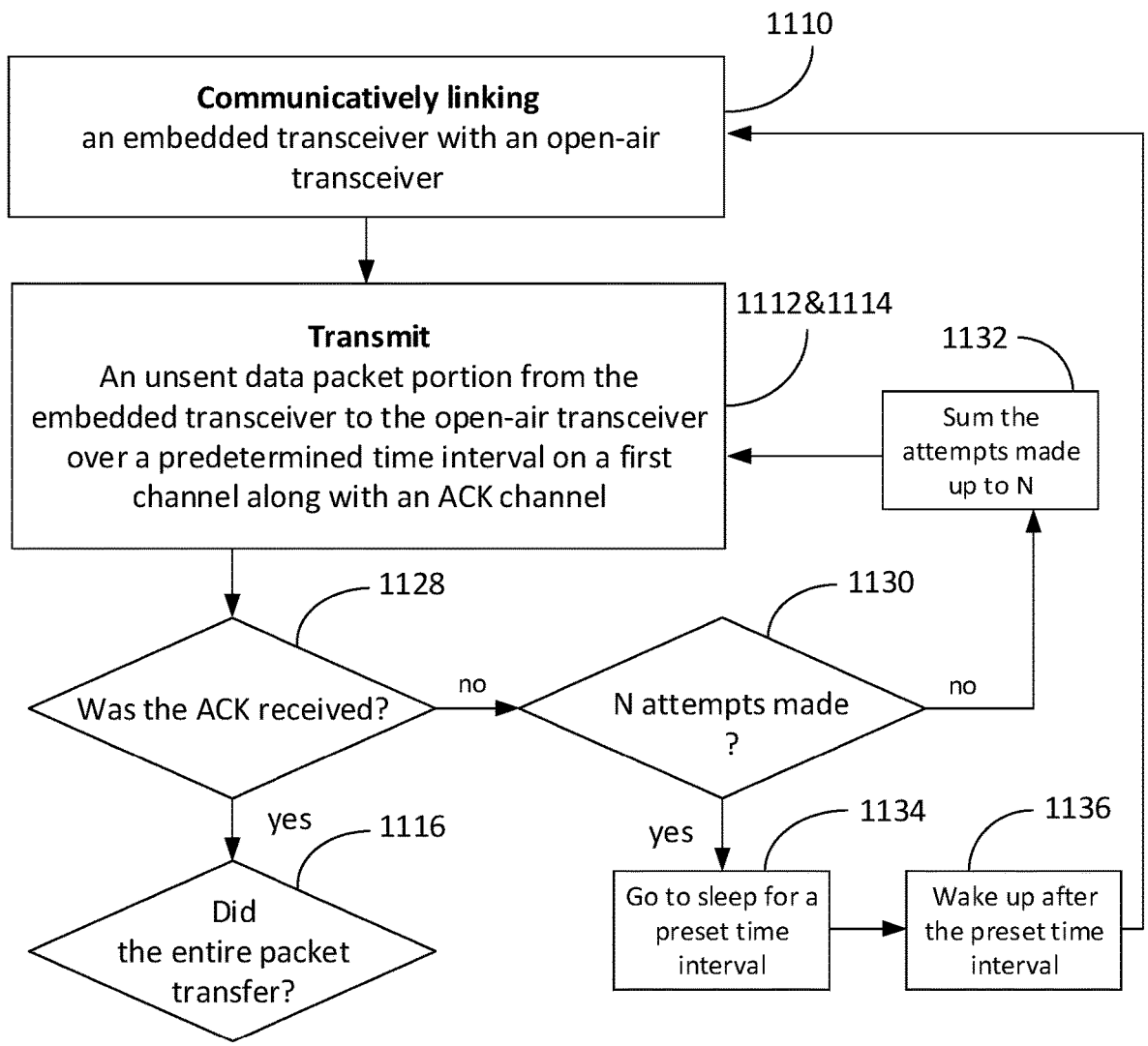
FIG. 13B is a sub-routine block diagram from FIG. 13A expanding on an acknowledgement embodiment consistent with embodiments of the present invention.

Though channel hopping is technically not required for outgoing data transmission because the attenuation of the signal is below 0.25 Watts in open-air, in the embodiment of FIG. 13B, channel hopping of a reduced number of channels, such as five channels, is envisioned to avoid collisions on a small scale. FIG. 13B is a sub-routine block diagram from FIG. 13A expanding on an acknowledgement embodiment consistent with embodiments of the present invention. The present subroutine embodiment is directed to acknowledgments for each unsent data packet portion and what to do if there is no ACK. The subroutine can be implemented after step 1110, which is a step for communicatively linking the embedded transceiver 130 with the open-air transceiver 106. Though channel hopping is technically not required for outgoing data transmission because the attenuation of the signal is below 0.25 Watts in open-air, reduced channel hopping can help avoid collisions on a small scale (for example, under 100 ISM embedded transceivers 130). If the data packet of step 1106 is larger than the maximum data size can be transmitted within a predetermined transmission time window (such as 0.4 seconds), the data packet will need to be broken into smaller data packet portions wherein each of the portions are within the transmission time window.

Steps 1112 and 1114 are combined in this diagram and are directed to transmitting an unsent data packet portion from the embedded transceiver 130 to the open-air transceiver 106 over a predetermined transmission time window on a first channel along with the ACK channel. The 'unsent data packet portion' distinguishes over an already sent portion of the data packet (that has been received by the open-air transceiver 106). Certain embodiments envision that the already sent data packet portion does not need to be resent. Certain embodiments envision the ACK channel appended on the end of the data packet portion to inform the open-air transceiver 106 over which channel to send the ACK. Because the open-air transceiver 106 must data hop over 50 channels when transmitting at 1 Watt, sending the ACK channel with the data packet portion eliminates the need for the embedded transceiver 130 to scan 50 channels in order to figure out channel is being used by the open-air transceiver 106. Only a single channel is technically needed for the ACK because the amount of data in the ACK is easily transmitted in the transmission time window.

With this in mind, the question block 1128 asks if the ACK was received by the embedded transceiver 130. If yes, proceed to decision block 1116 of FIG. 13A. If no, proceed to decision block 1130, which asks if N attempts to resend has been made. The number of attempts can be set by an end-user or can be a default in the algorithm run by the processor in the embedded transceiver 130. One embodiment envisions N attempts being three or four attempts to save battery power. If decision block 1130 is no, then add the number of attempts made until the number of attempts reaches N, step 1132, and proceed back to the transmission steps 1112 and 1114. If yes (i.e., the number of attempts has reached N) put the embedded transceiver 130 in a quiescent state for a preset time interval, step 1134. It can be reasonably assumed that after N attempts to send a data packet portion without success, that the embedded transceiver 130 is out of range from the open-air transceiver 106 or the open-air transceiver 106 does not have operational power. The quiescent state saves battery power in the embedded transceiver 130 until, hopefully, the embedded transceiver 130 comes back in the range of the open-air transceiver 106. Hence, after the preset time interval, the embedded transceiver 106 wakes up, step 1136, and attempts to form a communication link with the open-air transceiver step 1110. It should be appreciated that the steps are illustrative of many possible routines to manage power in the embedded transceiver 130 in the event a data packet is not successfully transmitted.

With the present description in mind, below are some examples of certain embodiments illustratively complementing some of the methods and apparatus embodiments to aid the reader. The elements called out below are examples provided to assist in the understanding of the present invention and should not be considered limiting. The illustrative embodiments can include elements from all the figures with special attention to FIGS. 1A, 1C, 11A, 11B, 12, 13A and 13B.

In that light, certain embodiment contemplate a wireless communication method comprising providing an embedded transceiver 130 that adheres to a radio frequency ("RF") regulatory requirement that defines a threshold power for transmission ("threshold power"). Above the threshold power, the embedded transceiver 130 adheres to hopping requirement parameters that includes hopping from a first frequency channel to one of a different predefined number of frequency channels at less than or equal to a designated time interval/window. Below the threshold power, adhering to non-hopping requirement parameters that do not include the hopping to the one of the different predefined number of the frequency channels at the time window. The method further includes powering the embedded transceiver 130 to an output transmission power 154 at or above the threshold power. Once powered, the method envisions embedding the embedded transceiver 130 in a transmission power attenuating medium 150 ("medium") that reduces the output transmission power 154 from above the threshold power inside of the medium 150 to below the threshold power outside of the medium 150. The embedded transceiver 130 is set to transmit data transmissions in accordance with the non-hopping requirement parameters. When embedded in the medium 150, a data packet is transmitted from the embedded transceiver 130.

Optionally the wireless communication method embodiment can further comprise providing an open-air transceiver 106 that receives the data packet, the open-air transceiver 106 adheres to the hopping requirement parameters. This method can further comprise setting the open-air transceiver 106 to essentially the output power, which is essentially equal to that of the embedded transceiver 130.

Optionally the wireless communication method embodiment can further comprise appending the data packet with an ACK channel number, which is a pseudorandom number between 1 and the predefined number of frequency channels. This method can further comprise setting the embedded transceiver 130 to receive an ACK response packet from an open-air transceiver 106 over the ACK channel number after the open-air transceiver 106 receives the data packet. This method can still further comprise the embedded transceiver 130 going into a quiescent state for a predetermined amount of time after receiving an ACK packet over an ACK channel from the open-air transceiver 106.

Optionally the wireless communication method embodiment can further be wherein the threshold power is approximately 0.25 Watt, the predefined maximum channel transmission window is approximately 0.4 seconds, and the predefined number of frequency channels is 50. This method can further be wherein the output power of the embedded transceiver 130 while inside of the medium 150 is approximately 1 Watt, which is essentially equal to an open-air transceiver 106 that receives the data packet, the open-air transceiver 106 adheres to the hopping requirement parameters.

Optionally the wireless communication method embodiment can further be wherein the embedded transceiver 130 is a cow bolus 102 and the medium 150 is cow tissue.

Optionally the wireless communication method embodiment can further comprise sensing a physical parameter by way of a sensor 510, the embedded transceiver 130 comprising the sensor 510. This method can further be wherein the data packet includes the physical parameter that was sensed by the sensor 510. This method can further be wherein the attenuating medium 150 is concrete.

Yet another embodiment of the present invention envisions a two-way wireless communication method comprising providing an embedded transceiver 130 and an open-air transceiver 106 that both comply with an RF regulatory requirement. The transceivers 130 and 106 are equally powered to an output power at or above a threshold power, wherein at or above the threshold power requires channel hopping of at least 25 channels "full channel hopping routine" in accordance with the RF regulatory requirement. Below the threshold power the RF requirements do not require channel hopping above 10 channels "limited channel hopping routine". Channel hopping is defined as changing from one of the channels to a different of the channels after a transmission time window that is less than a predefined maximum channel transmission window. The embedded transceiver 130 in a transmission power attenuating medium 150 that reduces the output power outside 152 of the attenuating medium 150 to below the threshold power. The embedded transceiver 130 is set to the limited channel hopping routine only because the embedded transceiver 130 is in the attenuating medium 150 when transmitting a data packet to the open-air transceiver 106.

Optionally the two-way wireless communication method embodiment can further comprise the embedded transceiver 130 transmitting a limited channel hopping routine extended preamble that includes 10 or less pseudorandom channels prior to the transmitting the data packet to the open-air transceiver 106. This embodiment can further comprise selecting a different pseudorandom channel while in the limited channel hopping routine prior to transmitting the limited channel hopping routine extended preamble. Alternatively, this embodiment can further be wherein the limited channel hopping routine extended preamble is shorter than a full channel hopping routine extended preamble that is transmitted before a transmission using the full channel hopping routine.

Optionally the two-way wireless communication method embodiment can further comprise the embedded transceiver 130 going into a quiescent state for a predetermined amount of time after receiving an ACK packet over an ACK channel from the open-air transceiver 106.

Still yet another embodiment contemplates a transceiver data exchange method comprising providing an embedded transceiver 130 that adheres to an RF regulatory requirement that defines a threshold power. When above the threshold power the embedded transceiver 130 adheres to hopping requirement parameters that includes hopping to one of a different predefined number of frequency channels at a time interval of less than a predefined maximum channel transmission interval "high power channel hopping routine". Below the threshold power, the embedded transceiver 130 adheres to non-hopping requirement parameters that do not include the hopping to the one of the different predefined number of the frequency channels at the time interval "low power channel hopping routine". The embedded transceiver 130 is embedded in a transmission power attenuating medium 150 that reduces transmission power from above the threshold power inside of the medium 150 to below the threshold power outside of the medium 150. The embedded transceiver 130 is powered to an output power at or above the threshold power. Only because the embedded transceiver 130 is embedded in the medium 150, setting the embedded transceiver 130 to transmit data transmissions with the low power channel hopping routine. For example, if the embedded transceiver 130 was not embedded in the medium 150 then the transceiver could not be set to the low power channel hopping routine. A data packet is then transmitted from the embedded transceiver 130 when embedded in the medium 150 at the lower power channel hopping routine.

Optionally, the transceiver data exchange method embodiment can further comprise providing an open-air transceiver receiving the data packet, the open-air transceiver 106 is powered essentially at the output power to match the embedded transceiver power, the open-air transceiver 106 adhering to the high power channel hopping routine.

Optionally, the transceiver data exchange method embodiment is further envisioned wherein the embedded transceiver 130 (102) and the medium 150 is a cow reticulum. In other words, the embedded transceiver is the cow bolus in this embodiment. The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though the embodiments of an ISM transceiver are described herein, other kinds of battery operated transceivers subject to hopping can be equally applied when embedded in an attenuating medium without departing from the scope and spirit of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed.

What is claimed is:

1. A wireless communication method comprising:
   providing an embedded transceiver;
   adhering to a radio frequency ("RF") regulatory requirement that defines a threshold power for transmission ("threshold power"),
   above the threshold power, adhering to hopping requirement parameters that includes hopping from a first frequency channel to one of a different predefined number of frequency channels at less than or equal to a designated time interval,
   below the threshold power, adhering to non-hopping requirement parameters that do not include the hopping to the one of the different predefined number of the frequency channels at the time interval;
   powering the embedded transceiver to an output transmission power at or above the threshold power;
   embedding the embedded transceiver in a transmission power attenuating medium ("medium") that reduces the output transmission power from above the threshold power inside of the medium to below the threshold power outside of the medium;
   setting the embedded transceiver to transmit data transmissions in accordance with the non-hopping requirement parameters; and
   transmitting a data packet from the embedded transceiver when embedded in the medium.

2. The method of claim 1 further comprising providing an open-air transceiver that receives the data packet, the open-air transceiver adheres to the hopping requirement parameters.

3. The method of claim 2 further comprising setting the open-air transceiver to essentially the output power, which is essentially equal to that of the embedded transceiver.

4. The method of claim 1 further comprising appending the data packet with an ACK channel number, which is a pseudorandom number between 1 and the predefined number of frequency channels.

5. The method of claim 4 further comprising setting the embedded transceiver to receive an ACK response packet from an open-air transceiver over the ACK channel number after the open-air transceiver receives the data packet.

6. The method of claim 5 further comprising the embedded transceiver going into a quiescent state for a predetermined amount of time after receiving an ACK packet over an ACK channel from the open-air transceiver.

7. The method of claim 1 wherein the threshold power is approximately 0.25 Watt, the predefined maximum channel transmission interval is approximately 0.4 seconds, and the predefined number of frequency channels is 50.

8. The method of claim 7 wherein the output power of the embedded transceiver while inside of the medium is approximately 1 Watt, which is essentially equal to an open-air transceiver that receives the data packet, the open-air transceiver adheres to the hopping requirement parameters.

9. The method of claim 1 wherein the embedded transceiver is an animal bolus and the medium is animal tissue.

10. The method of claim 1 further comprising sensing a physical parameter by way of a sensor, the embedded transceiver comprising the sensor.

11. The method of claim 10 wherein the data packet includes the physical parameter that was sensed by the sensor.

12. The method of claim 11 wherein the attenuating medium is defined as reducing the output transmission power more than 3% per linear foot.

13. A two-way wireless communication method comprising:
providing an embedded transceiver and an open-air transceiver that both comply with an RF regulatory requirement;
equally powering the transceivers to an output power at or above a threshold power, at or above the threshold power requires channel hopping of at least 25 channels "full channel hopping routine" in accordance with the RF regulatory requirement,
below the threshold power the RF requirements do not require channel hopping above 10 channels "limited channel hopping routine",
the channel hopping is defined as changing from one of the channels to a different of the channels after a time interval that is less than a predefined maximum channel transmission interval;
embedding the embedded transceiver in a transmission power attenuating medium that reduces the output power outside of the attenuating medium to below the threshold power;
setting the embedded transceiver to the limited channel hopping routine only because the embedded transceiver is in the attenuating medium when transmitting a data packet to the open-air transceiver.

14. The two-way wireless communication method of claim 13 further comprising the embedded transceiver transmitting a limited channel hopping routine extended preamble that includes 10 or less pseudorandom channels prior to the transmitting the data packet to the open-air transceiver.

15. The two-way wireless communication method of claim 14 further comprising selecting a different pseudorandom channel while in the limited channel hopping routine prior to transmitting the limited channel hopping routine extended preamble.

16. The two-way wireless communication method of claim 14 wherein the limited channel hopping routine extended preamble is shorter than a full channel hopping routine extended preamble that is transmitted before a transmission using the full channel hopping routine.

17. The two-way wireless communication method of claim 13 further comprising the embedded transceiver going into a quiescent state for a predetermined amount of time after receiving an ACK packet over an ACK channel from the open-air transceiver.

18. A transceiver data exchange method comprising:
providing an embedded transceiver;
adhering to an RF regulatory requirement that defines a threshold power,
above the threshold power, adhering to hopping requirement parameters that includes hopping to one of a different predefined number of frequency channels at a time interval of less than a predefined maximum channel transmission interval "high power channel hopping routine",
below the threshold power, adhering to non-hopping requirement parameters that do not include the hopping to the one of the different predefined number of the frequency channels at the time interval "low power channel hopping routine";
embedding the embedded transceiver in a transmission power attenuating medium ("medium") that reduces transmission power from above the threshold power inside of the medium to below the threshold power outside of the medium;
powering the embedded transceiver to an output power at or above the threshold power;
only because the embedded transceiver is embedded in the medium, setting the embedded transceiver to transmit data transmissions with the low power channel hopping routine; and
transmitting a data packet from the embedded transceiver when embedded in the medium.

19. The transceiver data exchange method of claim 18 further comprising providing an open-air transceiver receiving the data packet, the open-air transceiver powered essentially at the output power to match the embedded transceiver power, the open-air transceiver adhering to the high power channel hopping routine.

20. The transceiver data exchange method of claim 18 wherein the embedded transceiver and the medium is a cow reticulum.

* * * * *